(12) United States Patent
Jensen et al.

(10) Patent No.: US 7,394,869 B2
(45) Date of Patent: Jul. 1, 2008

(54) RF TRANSMITTER ARCHITECTURE FOR CONTINUOUS SWITCHING BETWEEN MODULATION MODES

(75) Inventors: Henrik T. Jensen, Long Beach, CA (US); Brima B. Ibrahim, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 750 days.

(21) Appl. No.: 10/816,731

(22) Filed: Apr. 2, 2004

(65) Prior Publication Data

US 2005/0220218 A1    Oct. 6, 2005

(51) Int. Cl.
    *H03C 3/00*  (2006.01)
(52) U.S. Cl. .................. 375/302; 375/272; 375/279; 375/295; 375/303; 375/308
(58) Field of Classification Search ............... 375/130, 375/135, 146–147, 272–273, 295, 279–284, 375/302–308, 232, 229, 271; 332/100, 103, 332/119; 455/127.1, 127.5, 93
    See application file for complete search history.

(56) References Cited

U.S. PATENT DOCUMENTS 5,440,265 A  *  8/1995  Cochran et al. ............. 329/300
5,832,027 A  *  11/1998 Ishigaki ...................... 375/149
5,945,885 A  *  8/1999  Schwartz et al. ............ 332/100
6,865,235 B2 *  3/2005  Khoini-Poorfard .......... 375/272
6,928,123 B2 *  8/2005  Zehavi ........................ 375/298
7,173,982 B1 *  2/2007  Yang et al. .................. 375/329
7,209,720 B2 *  4/2007  Balasubramaniyan
                                et al. ........................ 455/127.5
2004/0218683 A1* 11/2004 Batra et al. ................. 375/261

* cited by examiner

*Primary Examiner*—Shuwang Liu
*Assistant Examiner*—Hirdepal Singh
(74) *Attorney, Agent, or Firm*—Garlick Harrison & Markison; James A. Harrison

(57) ABSTRACT

The present invention provides a radio transmitter having a digital modulator that further includes logic for continuous amplitude and continuous phase modulation switching in an RF transmitter intended to support both frequency shift keying (FSK) and phase shift keying (PSK) modulation techniques in a smooth and continuous manner that does not violate spectral mask requirements. The invention supports continuous modulation switching both ways, i.e., from FSK to PSK and from PSK to FSK. In operation, the radio transmitter initially operates in a first communication mode, transmitting communication signals to a remote agent according to a first modulation technique at a first data rate and then transitions to the second modulation type at a second data rate without spectral mask violation.

20 Claims, 25 Drawing Sheets digital modulator 92

FIG. 3 radio transmitter 88

FIG. 4 digital modulator 92

FIG. 5 digital modulator 92

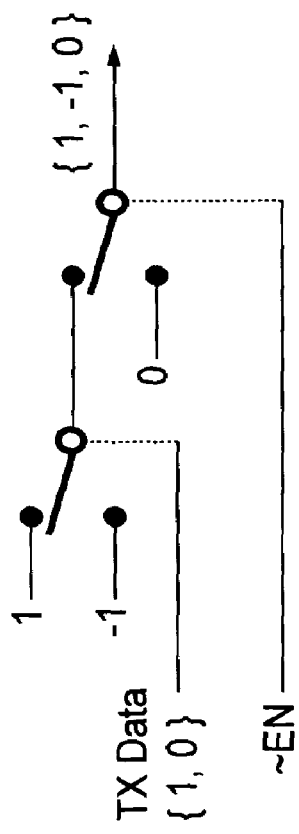
Figure 7   FSK symbol mapper
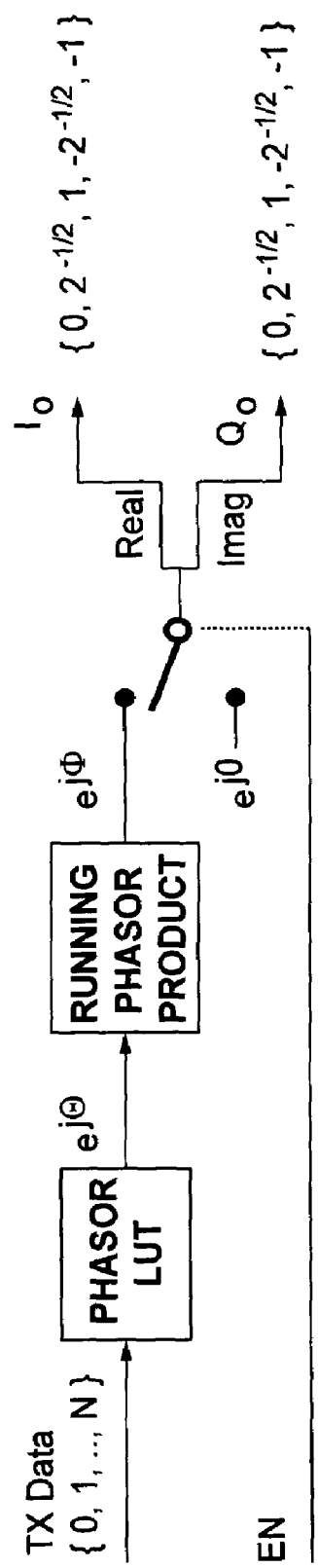
Figure 8   PSK symbol mapper

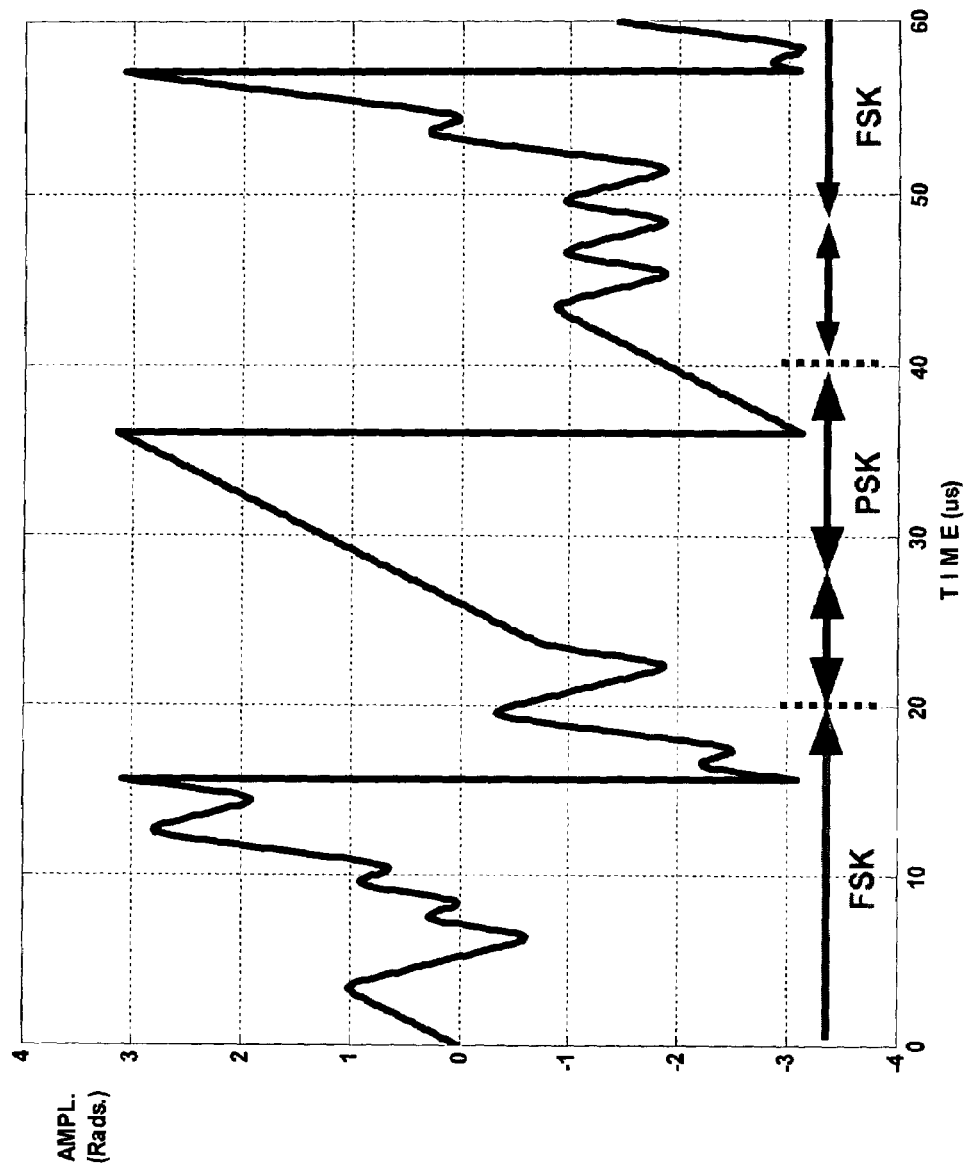
FIG 25  4x2 mux Q channel behavior

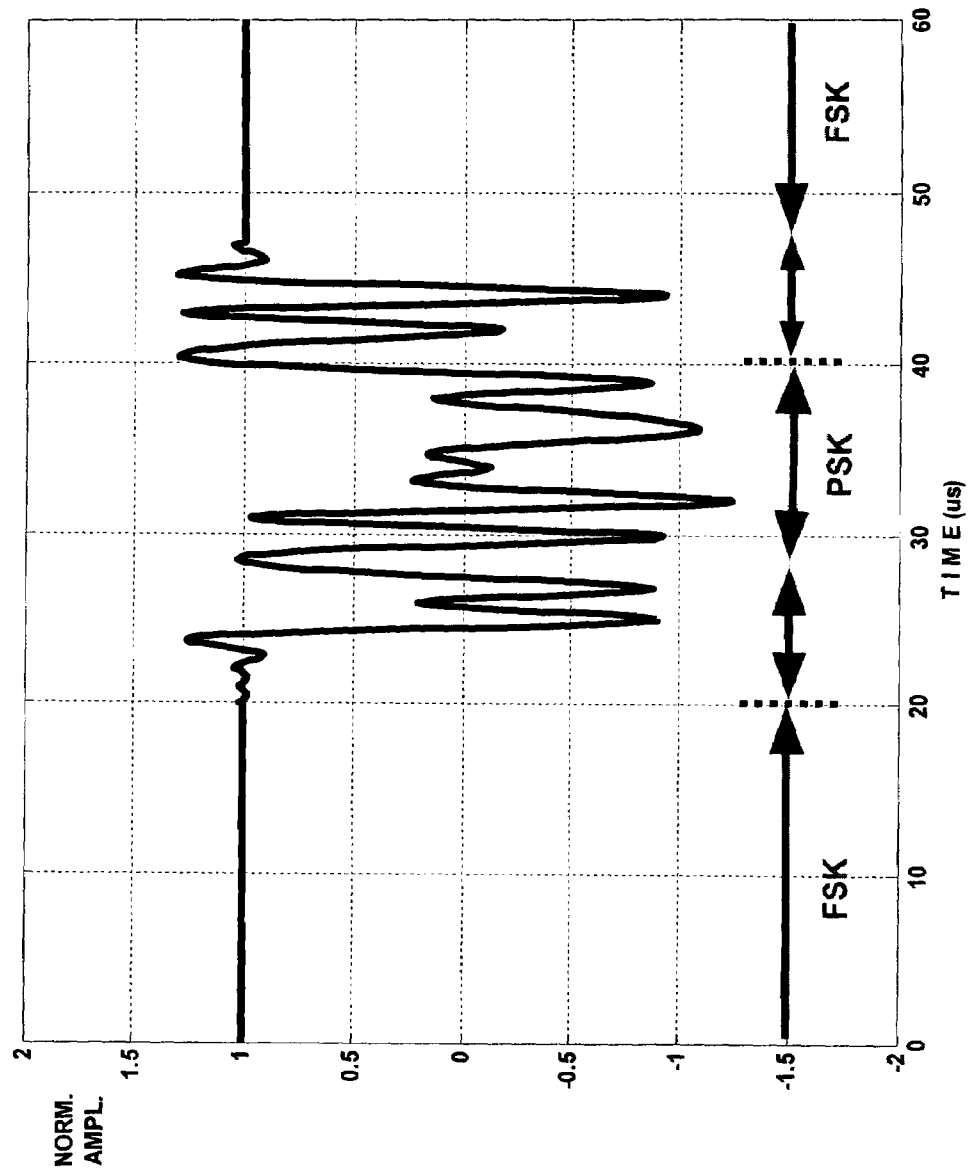
FIG 26 4x2 mux I channel behavior

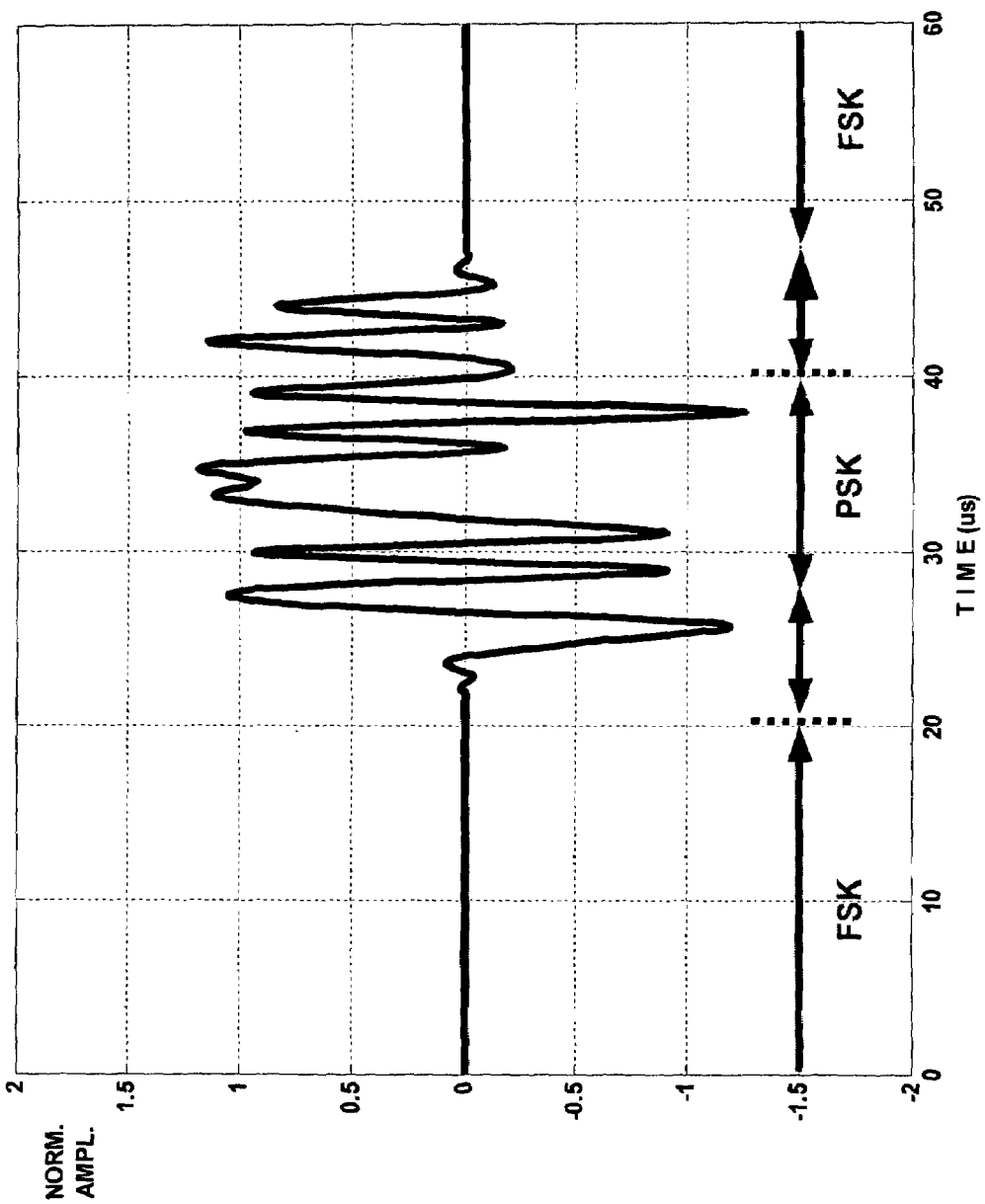
FIG 27 4x2 mux Q channel behavior

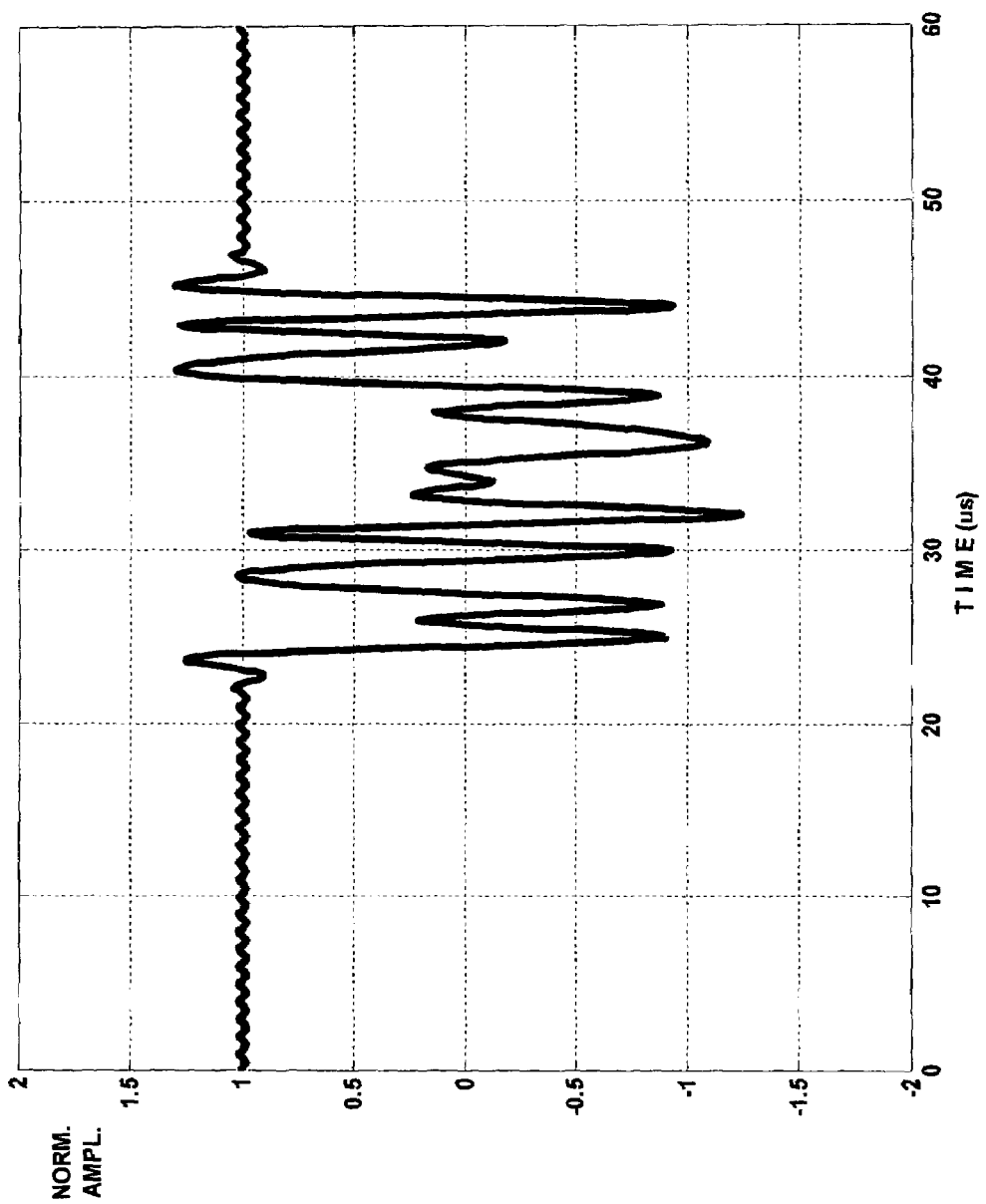
FIG 28  PSK$_I$ behavior in transition

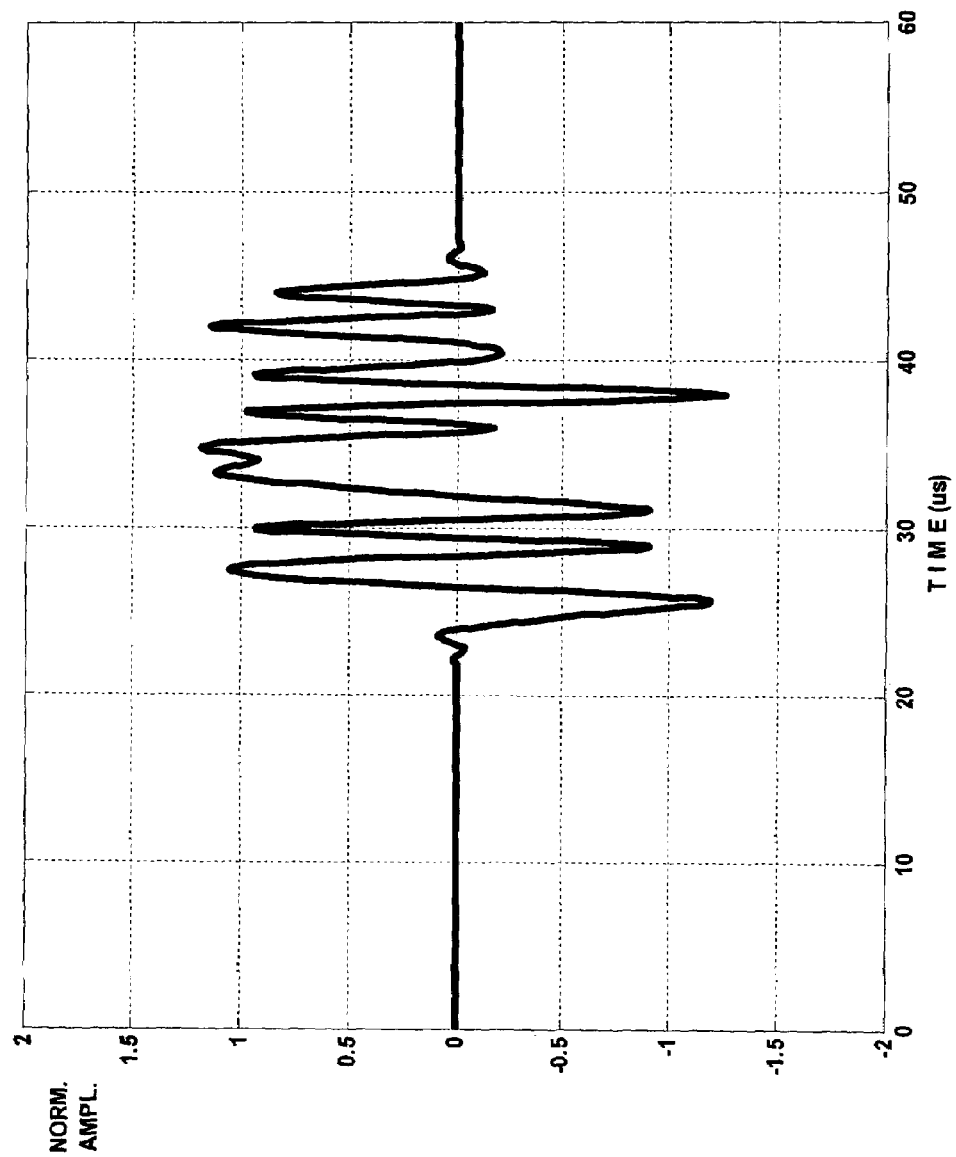
FIG 29 $PSK_Q$ behavior in transition

US 7,394,869 B2

RF TRANSMITTER ARCHITECTURE FOR CONTINUOUS SWITCHING BETWEEN MODULATION MODES

BACKGROUND

1. Technical Field

The present invention relates to wireless communications and, more particularly, wideband wireless communication systems.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switch telephone network (PSTN), via the Internet, and/or via some other wide area network.

Each wireless communication device includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with the particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage (de-modulator). The low noise amplifier receives an inbound RF signal via the antenna and amplifies it. The one or more intermediate frequency stages mix the amplified RF signal with one or more local oscillations to convert the amplified RF signal into a baseband signal or an intermediate frequency (IF) signal. As used herein, the term "low IF" refers to both baseband and intermediate frequency signals. A filtering stage filters the low IF signals to attenuate unwanted out of band signals to produce a filtered signal. The data recovery stage recovers raw data from the filtered signal in accordance with the particular wireless communication standard. Alternate designs being pursued at this time further include direct conversion radios that produce a direct frequency conversion often in a plurality of mixing steps or stages.

The various above described technologies are being utilized in a wide range of applications including the aforementioned wireless local area networks that are formed according to I.E.E.E. 802.11(a), 802.11(b), 802.11(g) and Bluetooth standards among others. As these standards evolve, however, there are multiple design pressures that sometimes are in conflict. For example, there is always demand for increasing levels of speed, reliability and more generally, data throughput. Continuous bit rate data, for example, streaming data, push the envelope of technical ability and performance.

As technologies evolve, there further is a need to maintain compatibility between newer and older technologies. Such compatibility is problematic, however, when a change in fundamental physical layer technology is made to satisfy the demand for increased speed and throughput. One example of this type of migration from one type of physical layer (layer 1) technology is seen in Bluetooth. The Bluetooth standards originally called for data rates of 1 million bits per second (Mbps) utilizing frequency shift keying modulation techniques. Newer releases of the Bluetooth standard, however, call for data transmission rates of 2 and 3 Mbps utilizing phase shift keying modulation techniques. Thus, while the fundamental modulation techniques are different, there is also a Bluetooth requirement for radio transceivers to maintain backwards compatibility. At the same time, there also exist spectral mask requirements that cannot be violated even for the instant of switching from one modulation type to another. It is known, however, that abruptly changing from one modulation type to another can result in spectral mask violations. Thus, the need for the invention arises from the requirement that during the transition between the two modulation formats, the transmitted RF spectrum comply with strict spectral mask limitations set by the applicable regulatory bodies. Typically, such requirements cannot be met when modulation switching occurs with abrupt, discontinuous waveforms. A need exists, therefore, for a radio transmitter that can transition from one modulation technique to another in a continuous, smooth manner that does not violate spectral mask requirements.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

A radio transmitter formed according to one embodiment of the present invention includes a Pulse Shaping block that is coupled to receive TX data from a TX data source, such as a baseband processor. The Pulse Shaping block produces frequency shift keyed (FSK) modulated TX data and phase-shift keyed (PSK) I and Q channel modulated data concurrently. Multiplexer (mux) circuitry is coupled to receive the I and Q channel modulated data, as well as a logic 1 and a logic 0. In the described embodiment, the mux circuitry, which comprises a 4×2 mux, outputs one of the I and Q channel modulated data or the logic 1 and logic 0 according to a received control command. The Pulse Shaping block, in operation, modulates a stream of 0 bits and produces a stream of FSK modulated 0 values and PSK modulated I and Q data for a first logic state of a mode control signal, and further produces FSK modulated TX data for a second logic state of the mode control signal. Accordingly, the mux control circuitry, by sending control signals to the mux, couples either the PSK modulated I and Q data to downstream modulation circuitry for the first logic state of the mode control signal and couples the logic 1 and logic 0 to the downstream modulation circuitry for the second logic state of the mode control signal. The downstream modulation circuitry further includes a coordinate rotation digital computer (CORDIC) that receives the FSK modulated signals (either 0 values or phase information), as well as the I and Q channels (either the I and Q channel modulated data or the logic 1 and logic 0).

Coupled between the Pulse Shaping block and the CORDIC, is a phase accumulator that receives and accumulates phase information from the Pulse Shaping block. Accordingly, even when the Pulse Shaping block produces a stream of FSK modulated 0 values, the phase accumulator will produce a phase since its output is continuously fed into its input in a feedback loop. By adding a constant at the accumulator input, a phase ramp, or, equivalently, a non-zero IF frequency, can be imposed upon the transmitted signal.

In operation, the radio transmitter initially operates in a first communication mode, transmitting communication signals to a remote agent according to a first protocol utilizing a first modulation technique at a first data rate. For example, the first protocol may comprise an FSK modulation for legacy Bluetooth protocol communications at a 1 Mbps data rate. Upon determining that the remote agent is capable of communicating in a second protocol (e.g., medium rate Bluetooth) at a second data rate of 2 or 3 Mbps utilizing a second modulation technique, the radio transmitter will operate in a transition mode for a short period transmitting communication signals with a remote agent according to the first and second modulation techniques. Finally, in a second communication mode, the transmitter transmits communication signals with a remote agent solely according to the second protocol utilizing the second modulation technique at the second data rate. Throughout the first and second communication modes, as well as the transition mode, the transmitter, according to the described embodiments of the invention, will transmit in accordance with spectral mask requirements.

BRIEF DESCRIPTION OF THE DRAWINGS

A better understanding of the present invention can be obtained when the following detailed description of the preferred embodiment is considered with the following drawings, in which:

FIG. 7 is a functional schematic diagram of the binary FSK symbol mapper for use in the FSK mode of operation of the Bluetooth Medium Rate Standard;

FIG. 8 is a functional schematic of the PSK symbol mapper block of FIG. 7;

FIGS. 21 through 29 demonstrate the effectiveness of the invention when the example transmitter goes through modulation switching from FSK to PSK and back to FSK.

DETAILED DESCRIPTION OF THE DRAWINGS

Figure 1:
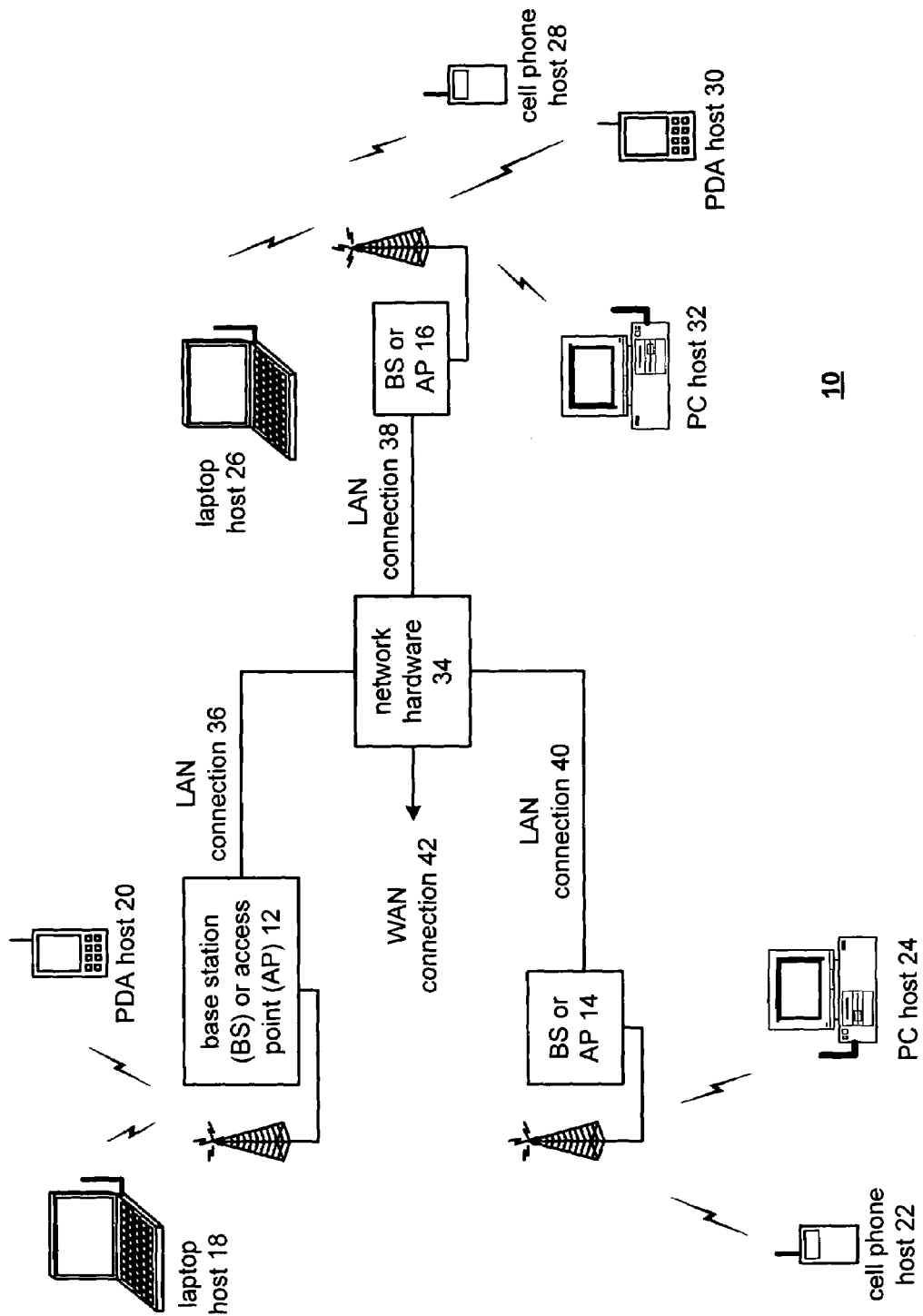
FIG. 1 is a functional block diagram illustrating a communication system that includes a plurality of base stations or access points (APs), a plurality of wireless communication devices and a network hardware component.

FIG. 1 is a functional block diagram illustrating a communication system 10 that includes a plurality of base stations or access points (APs) 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 5.

The base stations or APs 12-16 are operably coupled to the network hardware component 34 via local area network (LAN) connections 36, 38 and 40. The network hardware component 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

Figure 2:
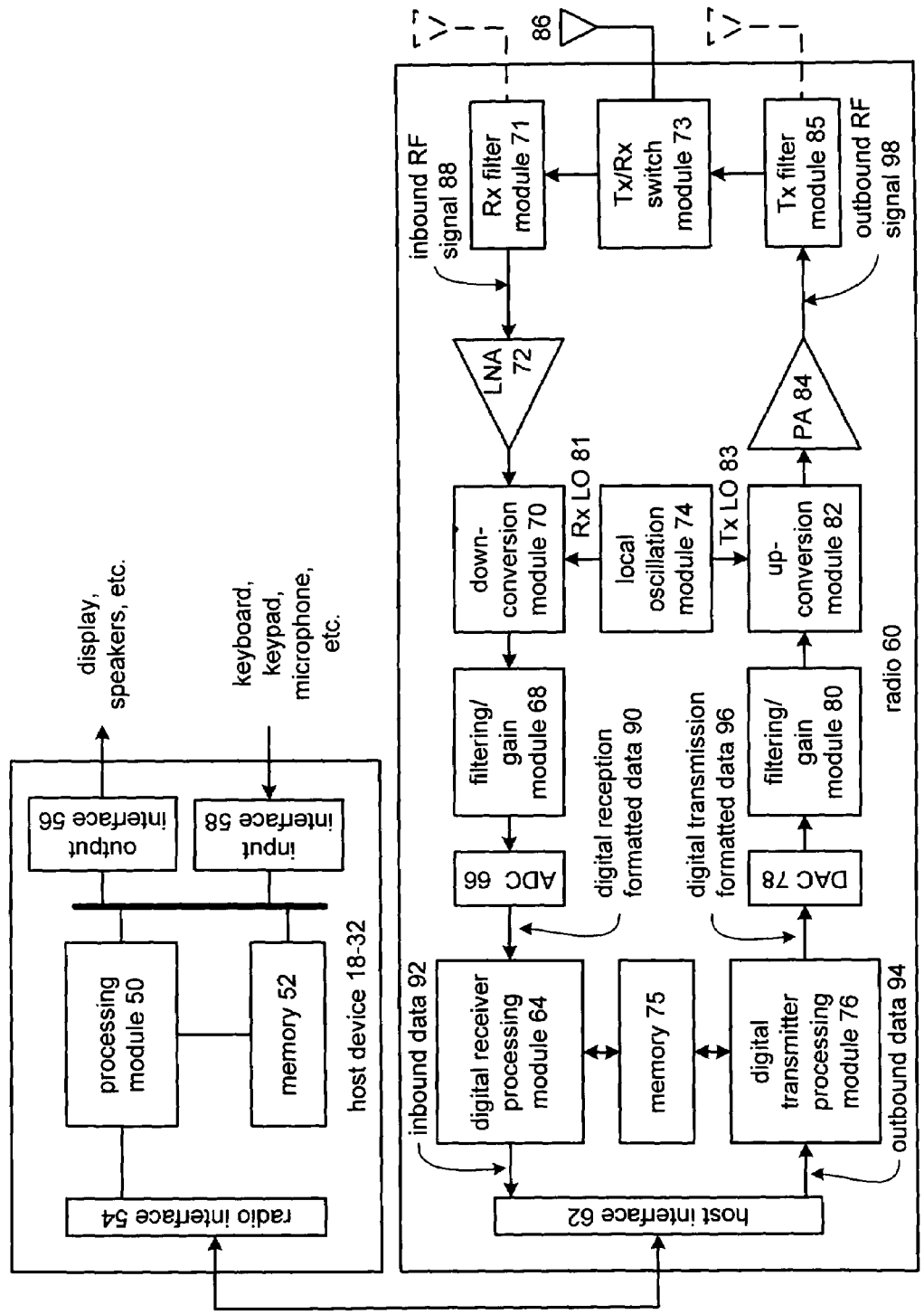
FIG. 2 is a schematic block diagram illustrating a wireless communication device as a host device and an associated radio.

FIG. 2 is a schematic block diagram illustrating a wireless communication device 18-32 as a host device and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host wireless communication device 18-32 includes a processing module 50, a memory 52, a radio interface 54, an input interface 58 and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output device such as a display, monitor, speakers, etc., such that the received data may be displayed. The radio interface 54 also provides data from the processing module 50 to the radio 60. The processing module 50 may receive the outbound data from an input device such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver (Tx/RX) switch module 73, a local oscillation module 74, a memory 75, a digital transmitter processing module 76, a digital-to-analog converter 78, a filtering/gain module 80, an IF mixing up-conversion module 82, a power amplifier 84, a transmitter filter module 85, and an antenna 86. The antenna 86 is shared by the transmit and receive paths as regulated by the Tx/Rx switch module 73. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, modulation. The digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the digital receiver processing module 64 and/or the digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 75 stores, and the digital receiver processing module 64 and/or the digital transmitter processing module 76 executes, operational instructions corresponding to at least some of the functions illustrated herein.

In operation, the radio 60 receives outbound data 94 from the host wireless communication device 18-32 via the host interface 62. The host interface 62 routes the outbound data 94 to the digital transmitter processing module 76, which processes the outbound data 94 in accordance with a particular wireless communication standard (e.g., IEEE 802.11a, IEEE 802.11b, Bluetooth, etc.) to produce digital transmission formatted data 96. The digital transmission formatted data 96 will be a digital baseband signal or a digital low IF signal, where the low IF typically will be in the frequency range of 100 KHz to a few Mega-Hertz.

The digital-to-analog converter 78 converts the digital transmission formatted data 96 from the digital domain to the analog domain. The filtering/gain module 80 filters and/or adjusts the gain of the analog baseband signal prior to providing it to the up-conversion module 82. The up-conversion module 82 directly converts the analog baseband signal, or low IF signal, into an RF signal based on a transmitter local oscillation 83 provided by local oscillation module 74. Local oscillation module 74 is, in one embodiment of the invention, a multi-stage mixer as described herein. The power amplifier 84 amplifies the RF signal to produce an outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch module 73, where the Rx filter module 71 bandpass filters the inbound RF signal 88. The Rx filter module 71 provides the filtered RF signal to low noise amplifier 72, which amplifies the inbound RF signal 88 to produce an amplified inbound RF signal. The low noise amplifier 72 provides the amplified inbound RF signal to the down-conversion module 70, which directly converts the amplified inbound RF signal into an inbound low IF signal or baseband signal based on a receiver local oscillation signal 81 provided by local oscillation module 74. Local oscillation module 74 is, in one embodiment of the invention, a multi-stage mixer as described herein. The down-conversion module 70 provides the inbound low IF signal or baseband signal to the filtering/gain module 68. The filtering/gain module 68 may be implemented in accordance with the teachings of the present invention to filter and/or attenuate the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host wireless communication device 18-32 via the radio interface 54.

As one of average skill in the art will appreciate, the wireless communication device of FIG. 2 may be implemented using one or more integrated circuits. For example, the host device may be implemented on a first integrated circuit, while the digital receiver processing module 64, the digital transmitter processing module 76 and memory 75 are implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of host device 18-32 and the digital receiver processing module 64 and the digital transmitter processing module 76 of radio 60 may be a common processing device implemented on a single integrated circuit. Further, memory 52 and memory 75 may be implemented on a single integrated circuit and/or on the same integrated circuit as the common processing modules of processing module 50, the digital receiver processing module 64, and the digital transmitter processing module 76.

Figure 3:
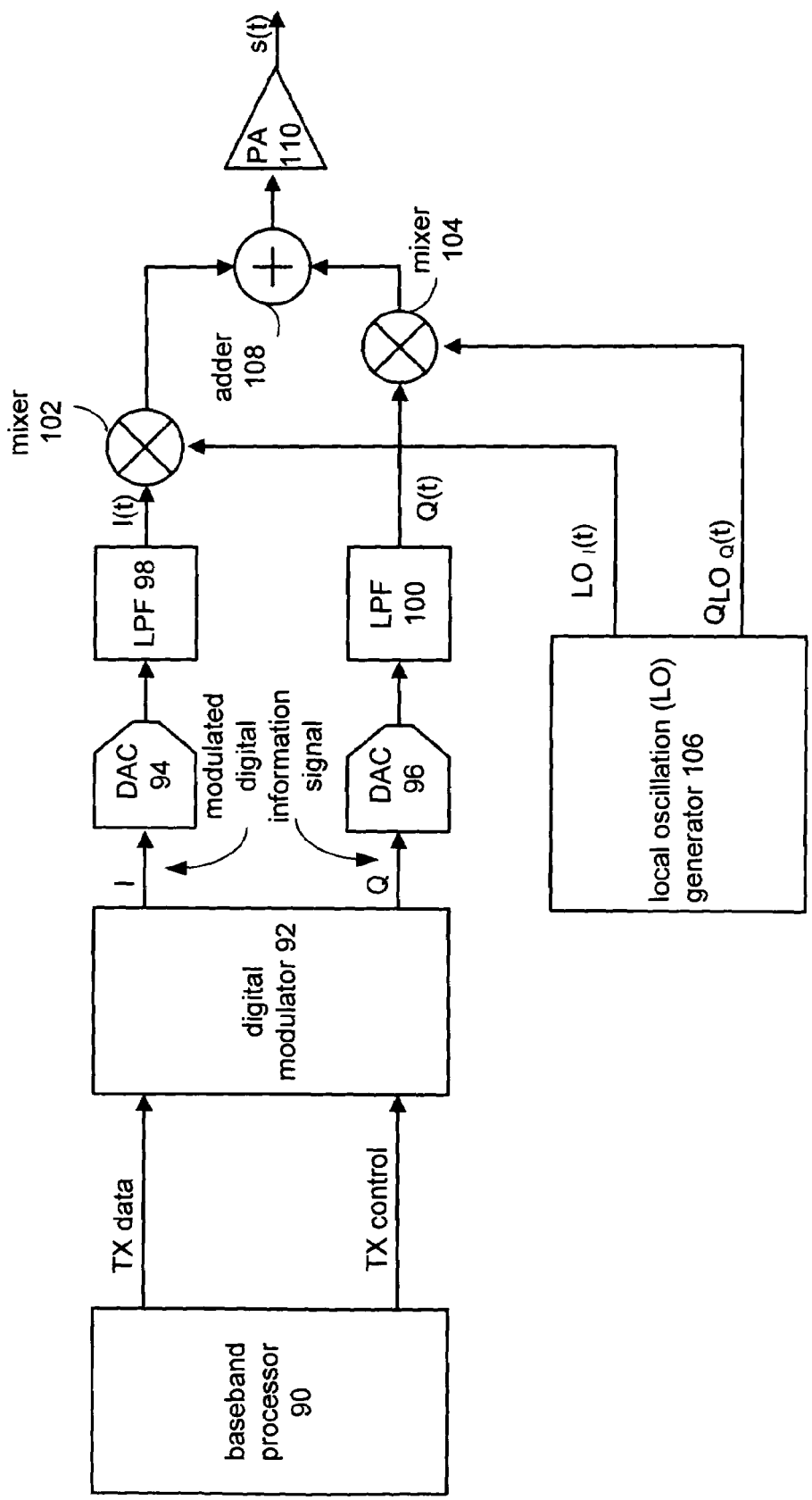
FIG. 3 is a functional block diagram of a radio transmitter formed according to one embodiment of the present invention.

FIG. 3 shows an example top level diagram of an RF transmitter in accordance with the present invention. The top-level diagram of an RF transmitter 88 of FIG. 3 is employed within the Bluetooth Medium Rate Standard in the described embodiment of the invention. The Medium Rate Bluetooth transmitter 88 employs both binary frequency-shift-keying (FSK) as well as 4 and 8 level phase-shift keyed (PSK) modulation. The baseband processor provides outgoing transmit data (TX data), i.e., either binary data for FSK modulation or 2- or 3-bit data for PSK modulation, as well as basic transmit (TX) timing control. The symbol rate remains constant while the data rate varies according to modulation type (data rate provided by the baseband processor varies).

While the modulation switching scheme proposed here is generally applicable to any transmitter that provides continuous switching between phase-shift keyed (PSK) and frequency shift keying (FSK) modes, many of the details are for an exemplary transmitter intended to support the Bluetooth Medium Rate Standard which employs both binary FSK as well as 4 and 8 level PSK modulation with a symbol rate of 1MHz. As shown in FIG. 3, RF transmitter 88 includes a baseband processor 90 that produces TX data and TX control to a digital modulator 92 followed by I/Q channel digital to analog converters (DACs) 94 and 96, low pass filters (LPFs) 98 and 100 that filter the continuous waveform outputs produced by DACs 94 and 96, mixers 102 and 104 that are coupled to received filtered continuous waveform signals from LPFs 98 and 100 for mixing with I and Q channel local oscillations produced by local oscillation generator 106 wherein mixers 102 and 104 produce upconverted I and Q channel RF signals. Finally, the I and Q channel RF signals are summed and produced to a power amplifier (PA) 110 for amplifying and radiating from an antenna.

The transmission from radio transmitters such as radio transmitter 88 are typically measured against one of a plurality of quality metrics. One quality metric is the Error Vector Measurement (EVM) which generally reflects how accurate relative to some reference modulation signal (how accurate does it duplicate the signal). Another quality metric relates to the emitted spectrum and, more specifically, how well spectral mask requirements are satisfied that specify maximum emissions around a specified center radio frequency (including spurs, etc.). Instantaneous shifting from FSK to PSK, or vice-versa, however leads to spectral "leakage" or violations of spectral mask requirements even if the leakage is only instantaneous.

The embodiments of the present invention, however, provide for continuous switching between the two modulation modes in a manner that does not violate spectral mask requirements. One application for the present invention is medium rate Bluetooth systems which include FSK modulation logic to support legacy (1 Mbps systems) and PSK modulation logic to provide 2 Mbps and 3 Mbps of data throughput according to the newer medium rate systems. More generally, however, the invention is applicable to any device that requires modulation switching for any reason including compatibility between systems or generations of systems.

Bluetooth only requires newer generation Bluetooth systems to be able to switch from FSK to PSK, but the present invention provides for switching in both directions without violating spectral mask requirements. In operation, a baseband processor supplies the data and control of the data to a digital modulator which then produces modulated digital data to digital-to-analog converters for converting to analog for processing and transmitting by an RF front end.

Figure 4:
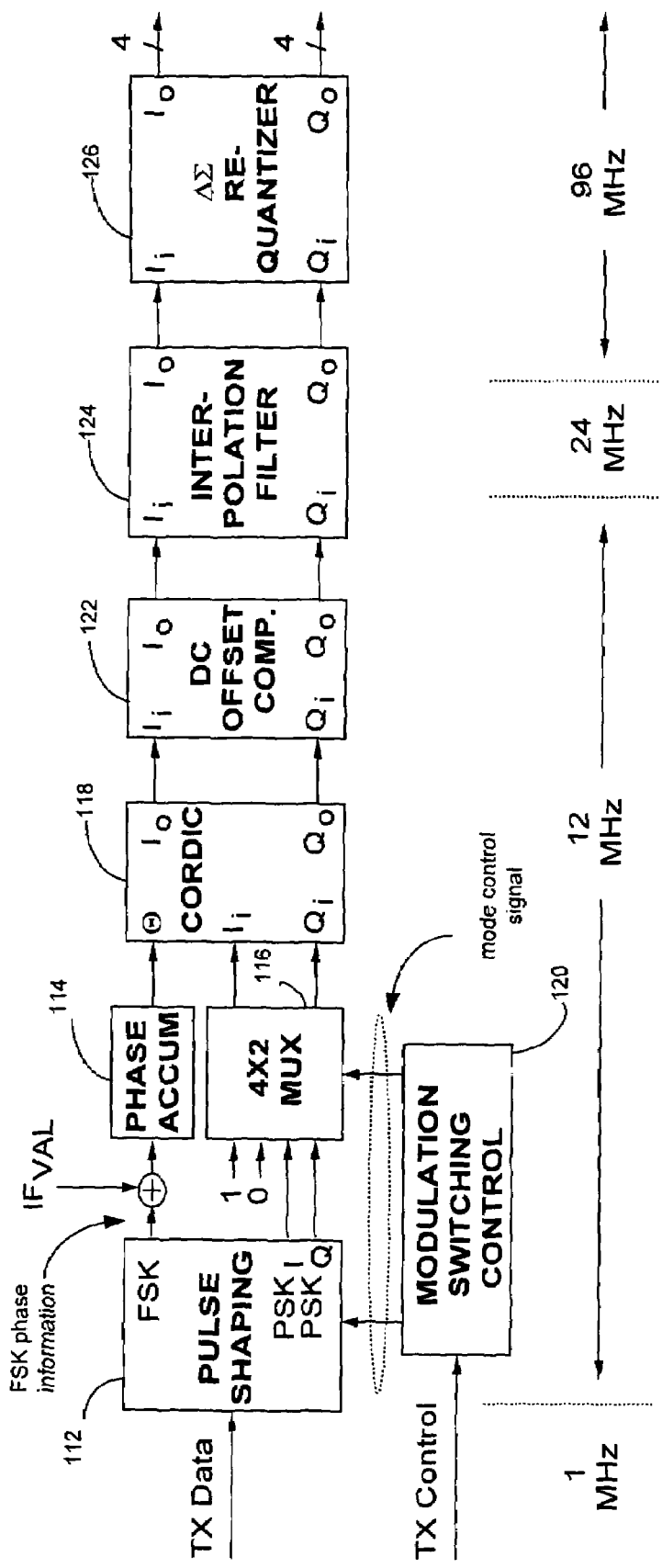
FIG. 4 shows details of the digital modulator block of FIG. 3.

FIG. 4 shows details of the digital modulator block of FIG. 3. Some aspects are design-oriented and related to specific embodiments and are provided as exemplary of best mode. In the system of FIG. 4, TX data is received according to a data rate for the current operational mode. For 1 Mbps data rates, TX data is one bit wide, 2 bits wide for 2 Mbps data rates, and 3 bits wide for 3 Mbps data rates. In this embodiment, therefore, the bits are received in parallel over a plurality of lines or traces. In an alternative embodiment, these bits are received in logical groups. Thus, in one embodiment of the invention for the 3-bit wide data, 3 sequential bits received serially are part of one value that is to be modulated into an 8-PSK symbol.

Generally, the pulse shaping block FSK modulates the 1 bit wide 1 Mbps TX data and PSK modulates the 2 and 3 bit wide data for the 2 Mbps and 3 Mbps data rates. For PSK, 2 bits relate to QPSK and 3 bits relate to 8-PSK. As may be seen therefore, the input TX data stream corresponds to a symbol rate processed by the digital modulator of FIG. 4.

The TX data enters the pulse shaping block 112. The pulse shaping block employs the digital filters shown below in FIG. 9 used to perform the necessary pulse shape filtering of the transmitter symbols, as defined by the communications standard. Stated differently, the pulse shaping block 112 limits the spectrum of the energy that is emitted in the RF band. In FSK, the amplitude is constant and only the phase or frequency changes to reflect the data. For example, for the Bluetooth Medium Rate Standard, the pulse shaping for FSK mode is done using a Gaussian filter (GF) with a BT product of 0.5, and pulse shaping for PSK mode is done using a square root raised cosine filter (RRCF) with a roll-off factor of 0.4. As will be explained in greater detail below, the present embodiment of the transmitter supports zero and low IF modulation.

Modulation to the desired IF frequency occurs cumulatively as the data is processed through the pulse shaping block 112, the phase accumulator 114, a 4×2 mux 116, and a CORDIC 118. The desired IF frequency is determined by the constant $IF_{VAL}$. In FSK mode, the symbols enter the GF within pulse shaping block 112 and the resulting continuous waveform, along with the desired $IF_{VAL}$ is accumulated in the phase accumulator 114. CORDIC 118 uses the Phase Accumulator output Θ (frequency since it's the integral of phase) to generate the FSK signal at the desired IF frequency by rotating a basis vector (Real, Imag)=(1,0) by the angle Θ.

In the described embodiment, when the transmitter is in an FSK mode of operation as specified by a mode control signal produced by modulation control block 120, the I and Q inputs to the CORDIC 118 are 1 and 0, respectively (thus specifying a vector base position of magnitude "1" along the real axis or "x" axis). Thus, according to a phase value received at the Θ input of the CORDIC 118, the vector is rotated from the base position. The I and Q outputs of the CORDIC 118, therefore, reflect Cartesian coordinates of the rotated vector. The CORDIC 118 thus merely rotates a signal around a unit circle according to a received phase value. Its movement is not abrupt because of a Gaussian filtered pulse stream produced by the pulse shaping block. Thus, the I and Q components produced by the CORDIC 118 are continuously but smoothly varying thereby avoiding spectral leakage caused by abrupt transitions.

The rotated vector of CORDIC 118 is produced to a DC offset compensation block 122 which pre-compensates for DC components that are introduced downstream to effectively counteract such low DC signals. The pre-compensated signals produced by DC offset compensation block 122 are then produced to an interpolation filter 124 which upsamples the output of DC offset compensation block to produce an upsampled output. The upsampled output is produced to a requantizer 126 which reduces the granularity of the interpolated data received from interpolator 124. The reduced granularity of the data reduces the required complexity of downstream digital-to-analog converters.

In PSK mode, the I and Q components of the symbols representing the received bits each enter the RRCF of a pulse shaping block. The resulting continuous complex waveform is translated to the desired IF frequency using the CORDIC 118. During this mode, the FSK output of the Pulse Shaping block is zero, hence the Phase Accumulator block output is a phase ramp, corresponding to the desired IF frequency. The phase value, which remains constant, is then added to the I and Q outputs of the CORDIC 118 to rotate the phase of the vector defined by the I and Q inputs.

Figure 5:
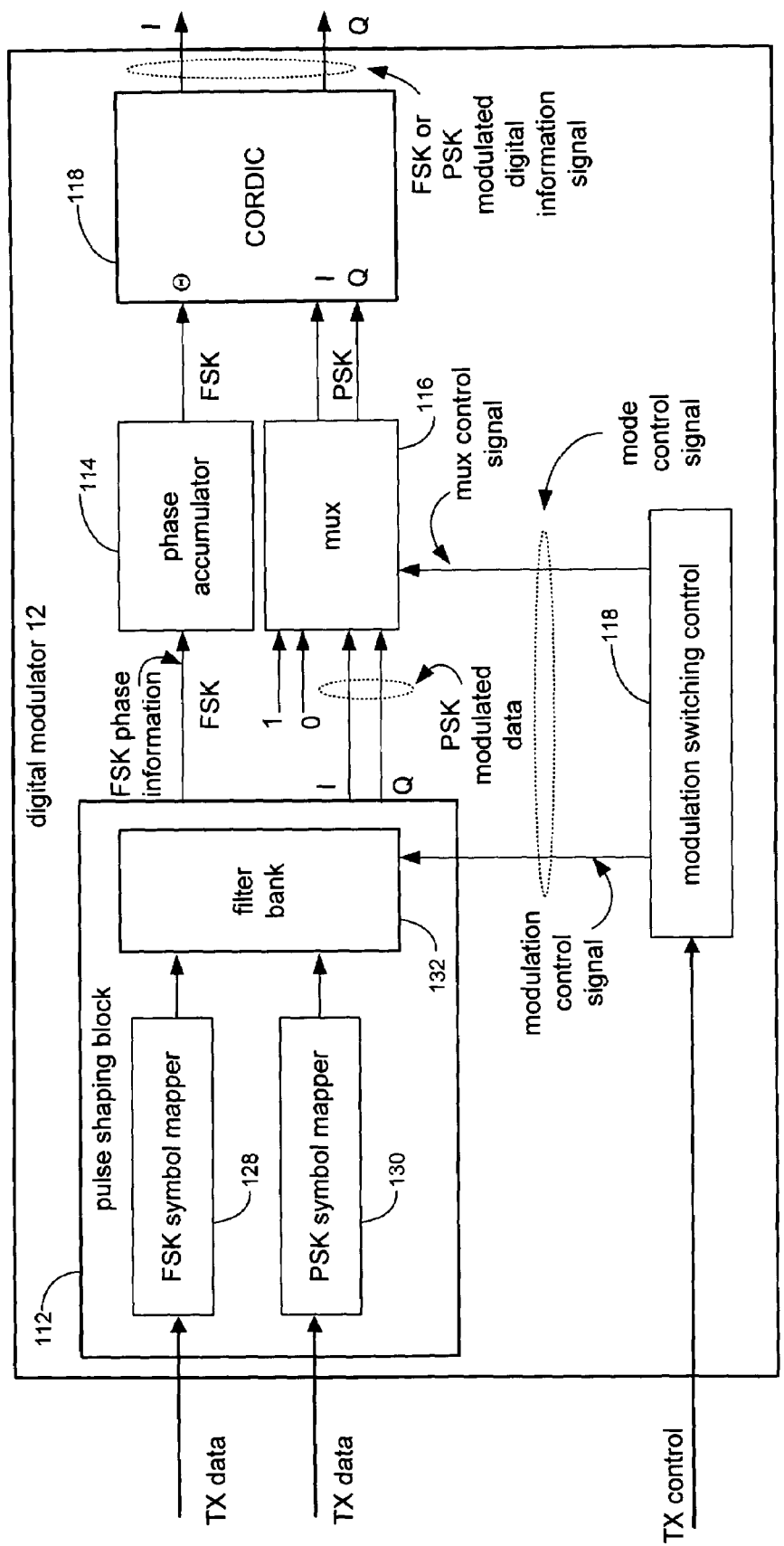
FIG. 5 is a functional block diagram of one embodiment of a digital modulator according to one embodiment of the invention.

FIG. 5 is a functional block diagram of one embodiment of a digital modulator according to one embodiment of the invention. As may be seen, FIG. 5 illustrates digital modulator 92 in greater detail than in FIG. 4. More specifically, pulse-shaping block 112 is coupled to receive TX data to form one of FSK or PSK symbols. More specifically, the TX data is received by an FSK symbol mapper 128 and by a PSK symbol mapper 130. Each of the symbol mappers 128 and 130, according to the mode of operation, produce FSK or PSK symbols to a filter bank 132. Filter bank 132, which is coupled to receive the symbols from FSK symbol mapper 128 and PSK symbol mapper 130, also is coupled to receive a modulation control signal from modulation switching control block 118.

In the described embodiment of the invention, FSK symbol mapper 128 produces phase information for FSK modulation to filter bank 132. PSK symbol mapper 130, however, produces PSK digital data according to the type of phase-shift keyed modulation being employed. The specific operation of FSK symbol mapper 128 and PSK symbol mapper 130 will be described in greater detail below.

Pulse Shaping block 112 produces one of two meaningful outputs. In an FSK mode of operation, as specified by the modulation control signal from modulation switching control block 118, pulse-shaping block 112 produces FSK phase information to a phase accumulator 114. In a PSK mode of operation, pulse-shaping block 112 produces PSK modulated data to a multiplexer mux 116. In a first mode of operation, namely FSK mode, the output on the I and Q channels for the PSK modulated data is a "don't care" signal. As may be seen, mux 116 is further coupled to receive a logic 1 and a logic 0. Thus, in the first mode of operation, namely the FSK mode, mux 116 receives a portion of a mode control signal, more specifically, a mux control signal, to select the logic 1 and logic 0 for outputting to a CORDIC. Accordingly, the I and Q channel outputs of pulse-shaping block 112 are decoupled from any circuitry by mux 116. Further, in the FSK mode of operation, pulse-shaping block 112 produces logical bits that represent phase information to the phase accumulator 114. Phase accumulator 114, as will be described in greater detail below, includes a delay element and a feedback loop to accumulate phase information as it is received.

CORDIC 118 is coupled to receive the phase information from phase accumulator 114, as well as phase-shift keyed information from mux 116. Accordingly, in the first mode of operation, namely the FSK mode of operation, CORDIC 118 receives a logic 1 for the I channel input and a logic 0 for the Q channel input, as well as the phase information from the phase accumulator. Accordingly, CORDIC 118 produces a unit vector having an angle theta that reflects the phase information received from phase accumulator 114. In a second mode of operation, namely a PSK mode of operation, the CORDIC 118 basically operates to produce a phasor whose magnitude is a function of the I and Q channel inputs and whose angle is a function of both the I and Q channel inputs and the phase information received from the phase accumulator. Considering that the phase accumulator 114 will continue to put out a constant phase value for a series of 0 input values, the constant received phase value theta is added to any angle defined by the I and Q channel inputs, namely the PSK modulated data produced by pulse-shaping block 112 and transmitted through mux 116. Accordingly, CORDIC 118 produces one of FSK or PSK modulated digital information signals.

Figure 6:
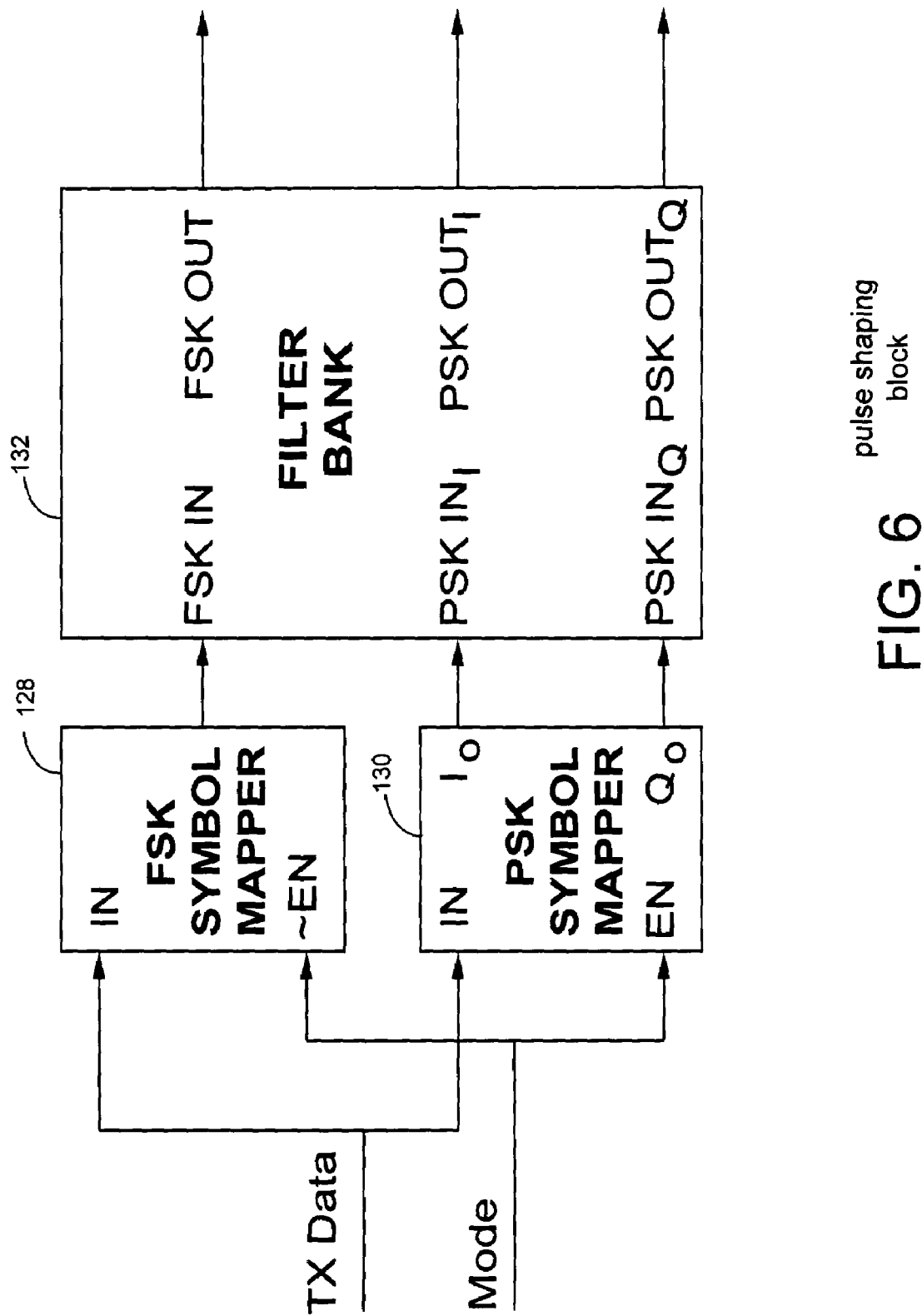
FIG. 6 is functional block diagram of the Pulse Shaping block according to one embodiment of the invention.

FIG. 6 is functional block diagram of the Pulse Shaping block according to one embodiment of the invention. The pulse shaping block comprises an FSK symbol mapper block and a PSK symbol mapper block as well as a filter bank block. As may be seen, the connectivity of FSK symbol mapper 128, PSK symbol mapper 130 and filter bank 132, are shown in greater detail. Both FSK symbol mapper 128 and PSK symbol mapper 130 are coupled to receive TX data at an input and a mode control signal at an enable input. As may be seen, FSK symbol mapper 128 and PSK symbol mapper 130 operate on opposite values of the mode control signal. To represent this operation, FSK symbol mapper enable input is shown to invert the mode control signal relative to the PSK symbol mapper. The output of FSK symbol mapper 128 is produced to the FSK input of filter bank 132, while the I and Q outputs of PSK symbol mapper 130 are provided to the PSK I and Q channel inputs of filter bank 132. The operation of filter bank 132 will be described in greater detail below. However, as may be seen, filter bank 132 produces three outputs, namely an FSK output and I and Q channel PSK outputs, which are also referenced here in this application as PSK modulated data. Generally, the I and Q outputs produced from PSK symbol mapper 130 are one of 4 or one of 8 discrete values based on the type of PSK modulation, namely QPSK or 8-PSK.

FIG. 7 is a functional schematic diagram of the binary FSK symbol mapper for use in the FSK mode of operation of the Bluetooth Medium Rate Standard. The input is binary $\{1, 0\}$ and maps to $\{1, -1\}$ when the Enable signal is active, otherwise the output of the Fsk Symbol mapper block is 0. It follows that the $k^{th}$ output of the FSK mapper belongs to the set $$\{-1,1,0\}, \quad (1)$$

or, in terms of magnitude and sign, $$\{0,1\}, \text{ and } \{+,-\} \quad (2)$$

FIG. 8 is a functional schematic of the PSK symbol mapper block of FIG. 7. The $k^{th}$ input is interpreted as integers in the range 0 ... N, where, for 4-PSK mode, N=3, and for 8-PSK mode, N=7. Each integer is mapped to a phasor, $e^{j\Theta_k}$, according to the Phasor look-up table shown below in Tables 1 and 2. The Running Phasor Product block of FIG. 3c maintains the product of all phasors, i.e., $$e^{j\Phi_k} = \Pi_{n=0}^{k} e^{j\Theta_n},$$

The outputs, $I_O$ and $Q_O$, of the PSK Symbol mapper block are the real and imaginary parts of the Running Phasor Product, respectively. It follows that $$I_{o,k} = \text{Re}\{e^{j\Phi_k}\} \in \left\{0, \frac{1}{\sqrt{2}}, 1, -\frac{1}{\sqrt{2}}, -1\right\}, \text{ and} \quad (3)$$

$$Q_{o,k} = \text{Im}\{e^{j\Phi_k}\} \in \left\{0, \frac{1}{\sqrt{2}}, 1, -\frac{1}{\sqrt{2}}, -1\right\},$$

or, in terms of magnitude and sign, $$|I_{o,k}|, |Q_{o,k}| \in \left\{0, \frac{1}{\sqrt{2}}, 1\right\}, \text{ and } \text{sgn}\{I_{o,k}\}, \text{sgn}\{Q_{o,k}\} \in \{+, -\} \quad (4)$$

While the above is a functional description of the PSK symbol mapper, a more implementation efficient version can be used in practice using a modulo-8 integer integrator operating on the output of an integer-valued LUT.

TABLE 1

| TX Data | Phasor |
|---|---|
| 0 | $e^{j\pi/4}$ |
| 1 | $e^{j3\pi/4}$ |
| 2 | $e^{-j\pi/4}$ |
| 3 | $e^{-j3\pi/4}$ |

TABLE 2

Phasor LUT of FIG. 8 for 4-PSK and 8-PSK modes, respectively, as defined by the Bluetooth Medium Rate Standard

| TX Data | Phasor |
|---|---|
| 0 | $e^{j0}$ |
| 1 | $e^{j\pi/4}$ |
| 2 | $e^{j3\pi/4}$ |
| 3 | $e^{j\pi/2}$ |
| 4 | $e^{-j\pi/4}$ |
| 5 | $e^{-j\pi/2}$ |
| 6 | $e^{j\pi}$ |
| 7 | $e^{-j3\pi/4}$ |

Figure 9:
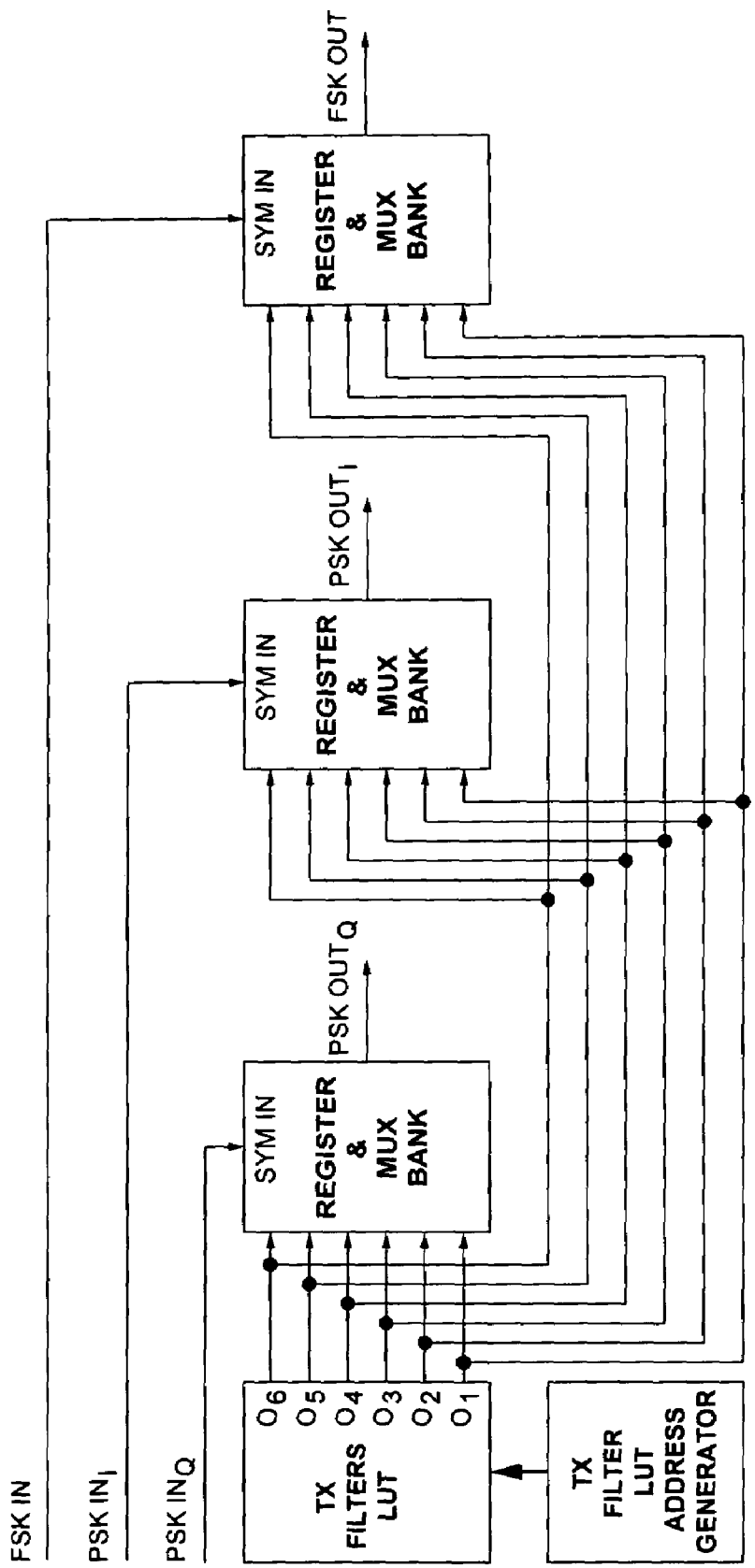
FIG. 9 shows the top level diagram of the Filter Bank of FIG. 6.

FIG. 9 shows the top level diagram of the Filter Bank of FIG. 6. The Tx Filters LUT block contains the coefficients of the GF for FSK pulse shaping as well as the RRCF for PSK pulse shaping. The TX Filter Lut Address Generator block generates the addresses needed to index into the appropriate locations of the LUT on a sample-by-sample basis. Two Register & Mux Bank blocks are used to generate in-phase and quadrature components for PSK modulation, while one Register & Mux Bank serves to generate the pulse shaped FSK signal. For the example Bluetooth Medium Rate Standard transmitter, the RRCF and GF filters are of length 72. Due to filter symmetry, the TX Filters Lut therefore contains 36 entries for each pulse shaping filter. Since, as indicated in FIG. 4, the filtering interpolates by a factor 12, only 6 non-zero output values are generated per clock cycle. The TX Filter LUT Address Generator maintains two pointers, e.g., "UpCounter" and "DownCounter", with initial values of 1 and 36, respectively. For every 12-MHz clock cycle, the TX Filter LUT Address Generator outputs addresses UpCounter,
UpCounter+12,
UpCounter+24,
and
DownCounter,
DownCounter-12,
DownCounter-24.

Then, UpCounter in incremented by 1, and DownCounter is decremented by 1. This continues until UpCounter reaches 12, whereafter it is reset to 1, and until DownCounter reaches 25 whereafter it is reset to 36. The outputs O1 ... O6 of the TX Filter LUT correspond to the above addresses, respectively, in the order stated.

Figure 10:
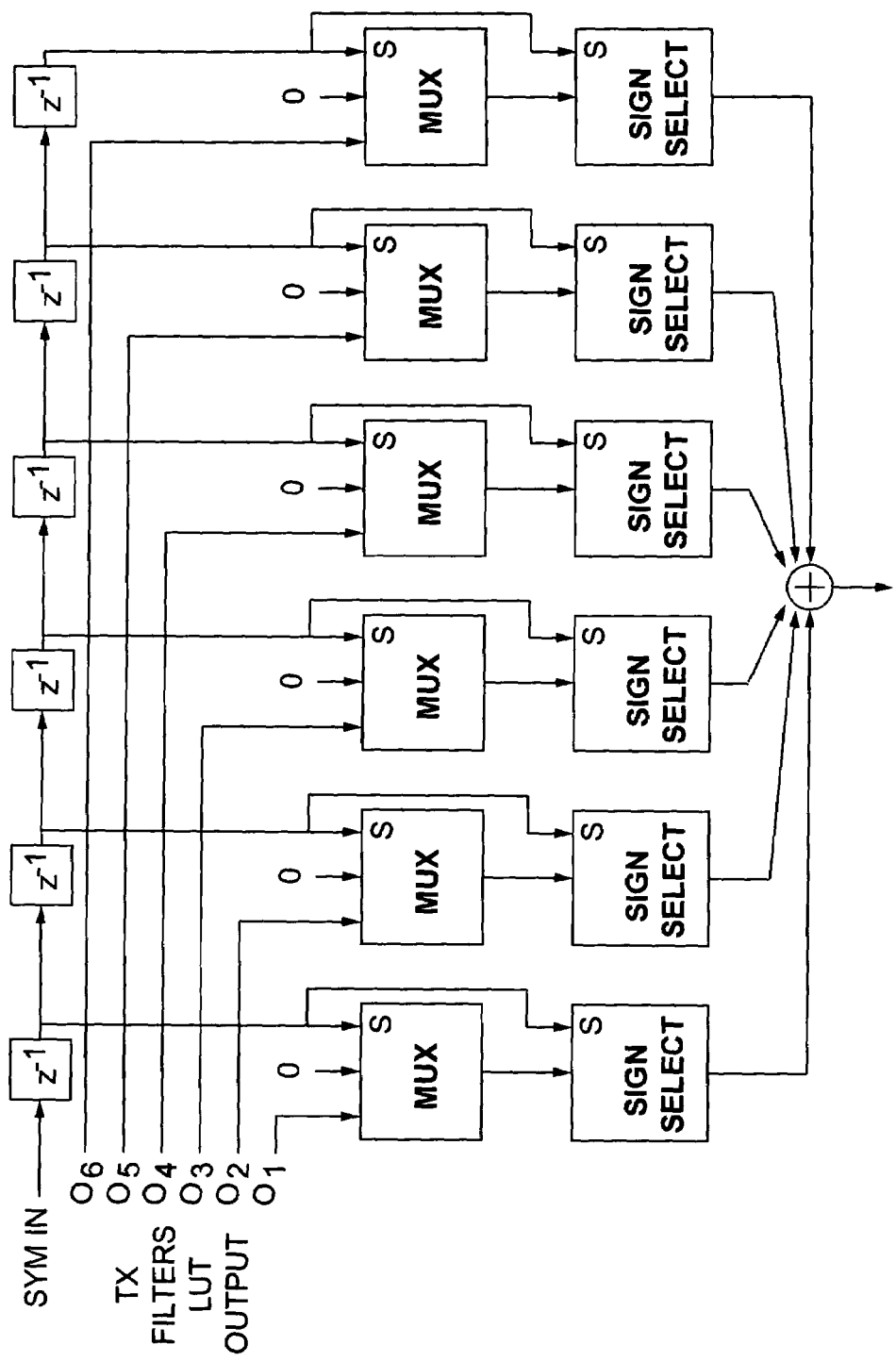
FIG. 10 is a top level functional schematic block diagram of a Register & Mux Bank block according to one embodiment of the invention.

FIG. 10 is a top level functional schematic block diagram of a Register & Mux Bank block according to one embodiment of the invention. This structure applies for either PSK or FSK modulation mode. Symbols, as defined functionally in equations (1) and (3) enter at the input labeled SYM IN. As shown in equations (2) and (4), the symbols can be processed according to magnitude and sign; hence a magnitude mux selects either the TX Filters Lut Output or zero, and a Sign Select block sets the sign of the output. All 6 output are then summed to form the output of the Register & Mux Bank.

Figure 12:
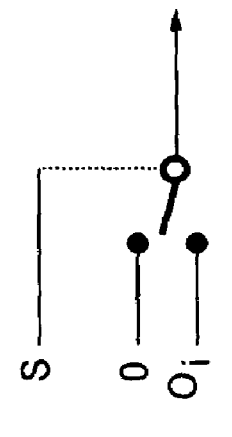
FIG. 12 shows the functional diagram of the mux block of FIG. 10 appropriate for binary FSK modulation mode.
Figure 11:
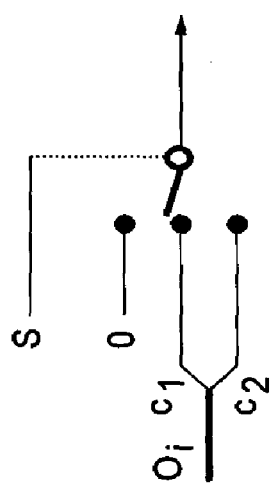
FIG. 11 shows the functional diagram of the mux block of FIG. 10 appropriate for PSK modulation mode.

FIG. 11 shows the functional diagram of the mux block of FIG. 10 appropriate for PSK modulation mode. As indicated, the output from the TX Filters Lut actually consists of two values, c1 and c2, corresponding to the desired filter coefficient and its value divided by $\sqrt{2}$, i.e., $c2=c1/\sqrt{2}$. This avoids the need to computationally generate c2. FIG. 12 shows the functional diagram of the mux block of FIG. 10 appropriate for binary FSK modulation mode. As indicated, the output from the TX Filters Lut consists of a single value, corresponding to the desired filter coefficient.

Figure 13:
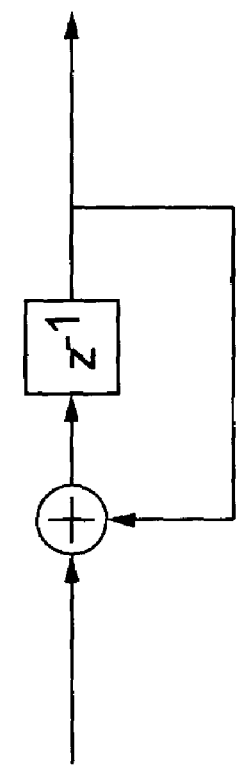
FIG. 13 shows the functional diagram of the Phase Accumulator block 114 of FIG. 4.

FIG. 13 shows the functional diagram of the Phase Accumulator block 114 of FIG. 4. It is a simple digital accumulator comprising a delay element and a feedback loop into an adder that adds the feedback to an input to act as an accumulator.

Figure 14A:
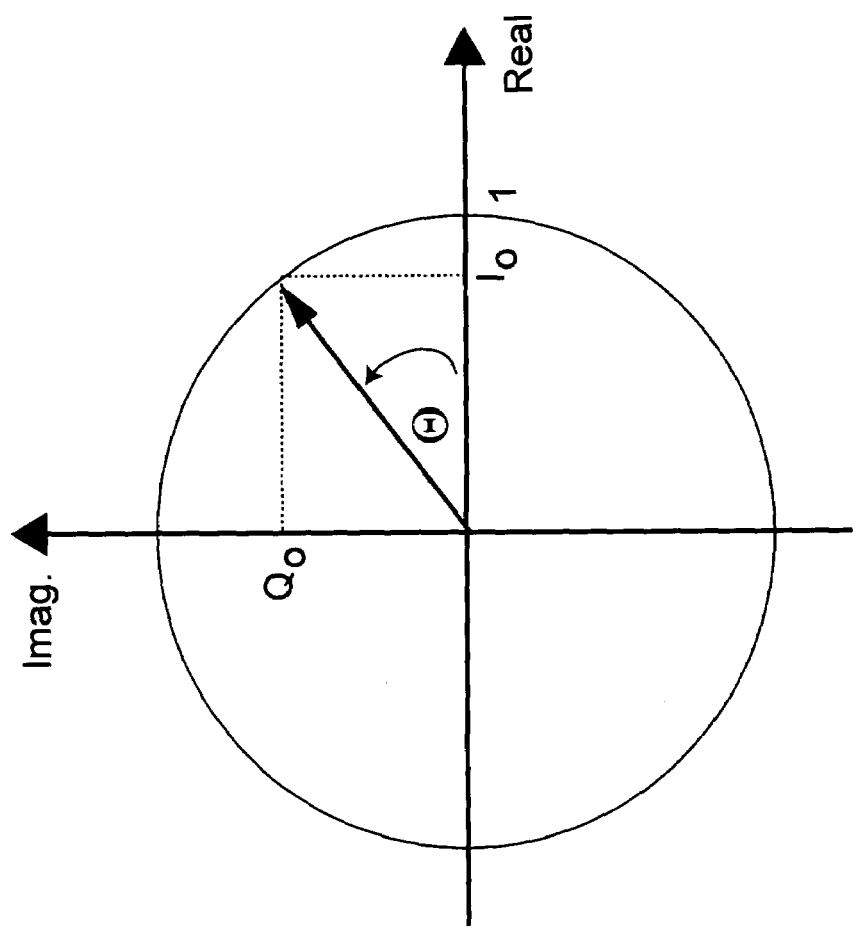
FIG. 14A shows the functional illustration of the CORDIC of FIG. 4 when the transmitter is in binary FSK modulation mode.
Figure 14B:
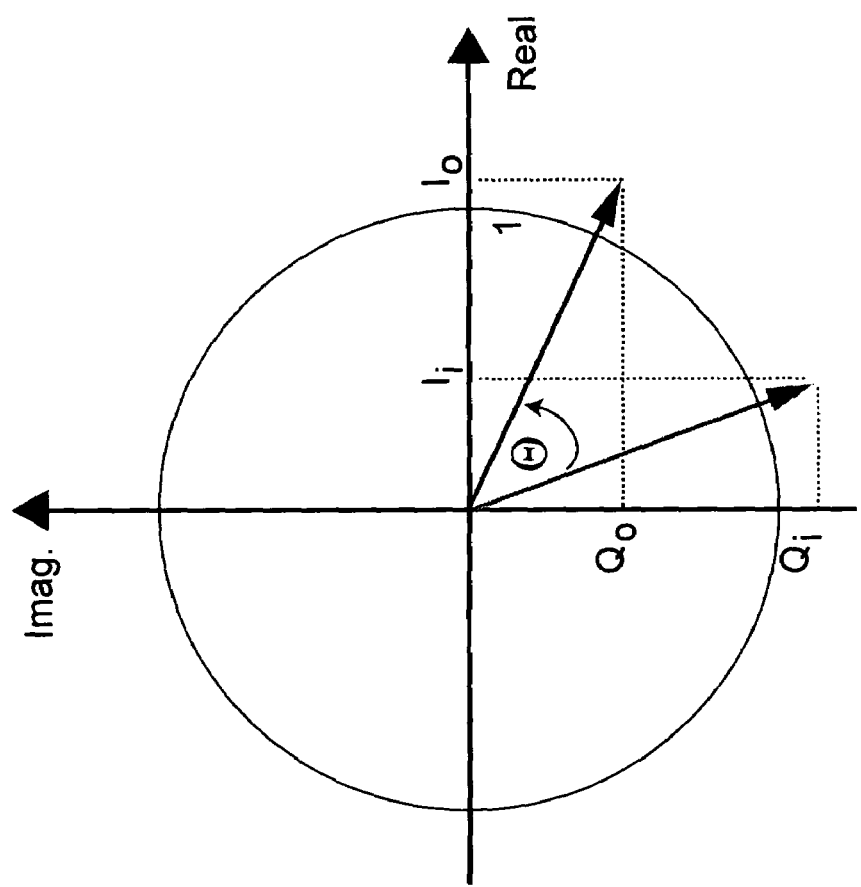
FIG. 14B shows the functional diagram of the CORDIC of FIG. 4 when the transmitter is in PSK modulation mode.

FIG. 14A shows the functional illustration of the CORDIC of FIG. 4 when the transmitter is in binary FSK modulation mode. A basis vector (Real,Imag)=(1,0) is rotated by the angle Θ dictated by the Phase Accumulator output. Generally, a CORDIC produces vector digital data for a given input (Cartesian Coordinate format). Thus, for an FSK signal, the vector data will have one of two values wherein the phase of the vector output represents the data corresponding to a logic value for a given symbol. FIG. 14B shows the functional diagram of the CORDIC of FIG. 4 when the transmitter is in PSK modulation mode. The in-phase and quadrature components of the Pulse Shaping block output are rotated by an angle Θ dictated by the Phase Accumulator output. Because the I and Q channels are separately filtered in the pulse shaping block, and the I represent the cosine of the argument while the Q represents the sine of the argument, there is no guarantee that the resulting magnitude will remain of a constant magnitude (e.g., "1").

Figures 15A, 15B:
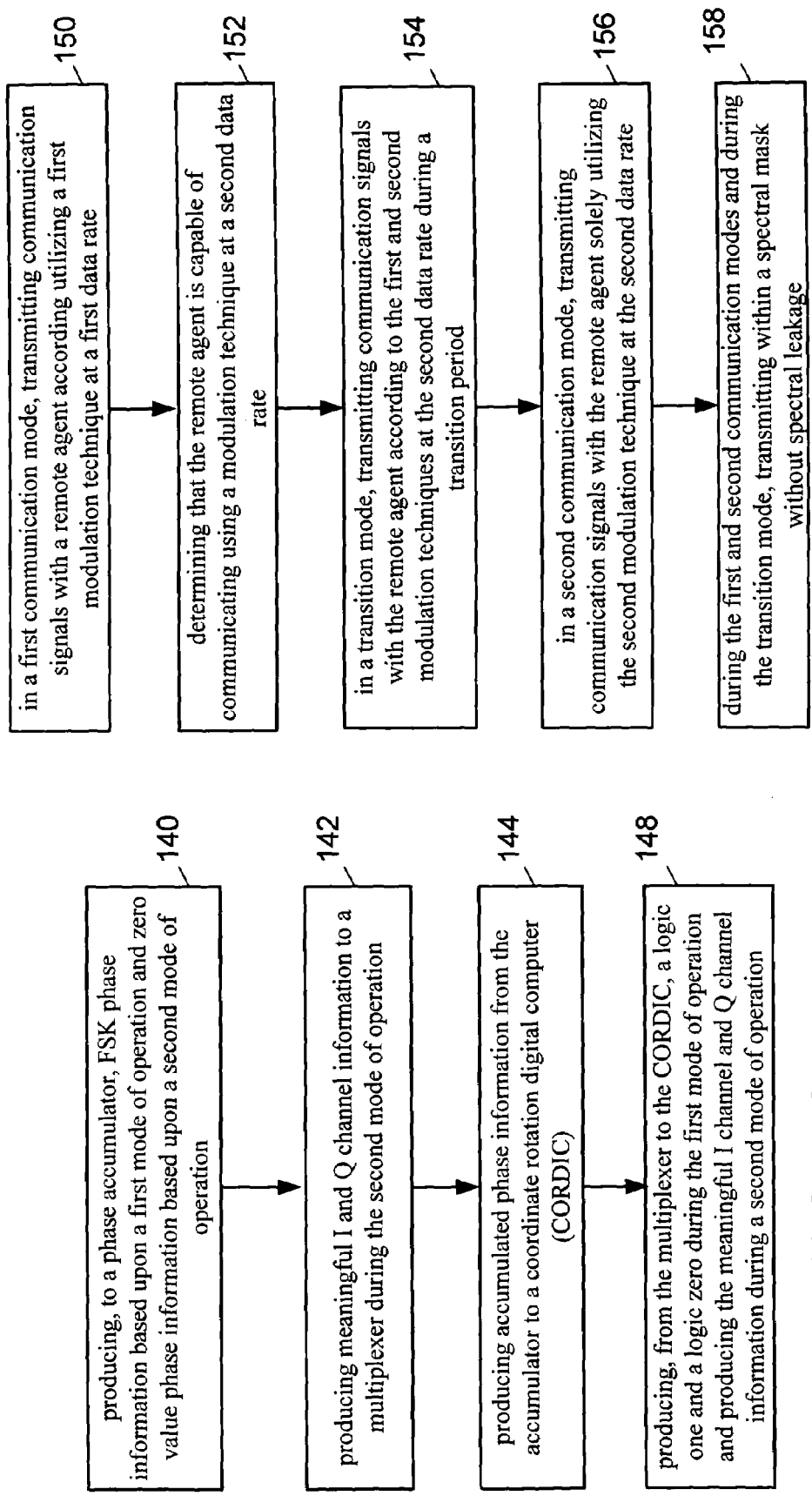
FIG. 15A is a flow chart illustrating a method in a radio transmitter comprising producing FSK phase information to a phase accumulator based upon a first mode of operation and zero value phase information based upon a second mode of operation.
FIG. 15B is a flow chart illustrating a method in a radio transmitter comprising, in a first communication mode, transmitting communication signals with a remote agent according utilizing a first modulation technique at a first data rate.

FIG. 15A is a flow chart illustrating a method in a radio transmitter comprising producing FSK phase information to a phase accumulator based upon a first mode of operation and zero value phase information based upon a second mode of operation (step 140). In a second mode of operation, however, the invention contemplates producing meaningful I and Q channel information to a multiplexer (step 142). The inventive method according to one embodiment includes operating in an FSK or a PSK or a transition mode of operation. While in the FSK mode of operation (the first mode), the embodiment of the present invention includes producing accumulated phase information from the accumulator to a coordinate rotation digital computer (CORDIC) (step 144) and producing, from the multiplexer to the CORDIC, a logic one and a logic zero during the first mode of operation and producing the meaningful I channel and Q channel information during a second mode of operation (step 146). These above methods further include producing, from the CORDIC, one of an FSK or a PSK modulated digital information signal, which, in the first mode of operation is based upon the logic one, the logic zero and the accumulated phase information and in the second mode of operation is based upon the accumulated phase information and upon the meaningful I and Q channel information.

FIG. 15B is a flow chart illustrating a method in a radio transmitter comprising, in a first communication mode, transmitting communication signals with a remote agent according utilizing a first modulation technique at a first data rate (step 150). Thereafter, the described embodiment includes determining that the remote agent is capable of communicating using a modulation technique at a second data rate (step 152). When switching modes, however, and operating in a transition mode, the method according to the embodiment of the present invention includes transmitting communication signals with the remote agent according to the first and second modulation techniques at the second data rate during a transition period (step 154).

In a second communication mode, the inventive method includes transmitting communication signals with the remote agent solely utilizing the second modulation technique at the second data rate (step 156). Finally, during the first and second communication modes and during the transition mode, the embodiments of the invention include transmitting within a spectral mask without spectral leakage (step 158).

Figure 16:
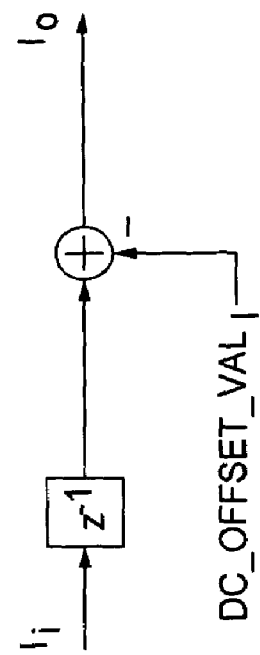
FIG. 16 shows the functional diagram of the DC Offset Compensation block of FIG. 4.

FIG. 16 shows the functional diagram of the DC Offset Compensation block of FIG. 4. It simply subtracts a constant programmable value from the input. Only one of the two phase paths is shown.

Figure 17:
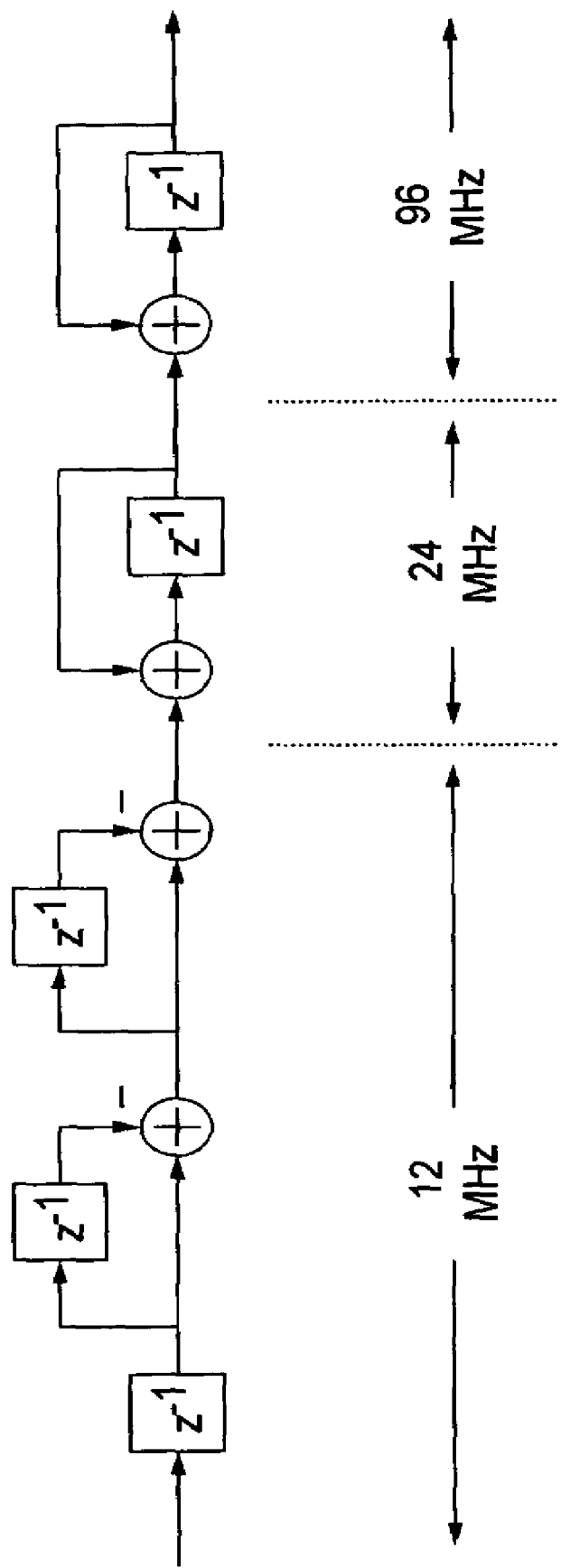
FIG. 17 shows the functional diagram of the Interpolation Filter block of FIG. 4.

FIG. 17 shows the functional diagram of the Interpolation Filter block of FIG. 4. Only one of the two phase paths is shown.

Figure 18:
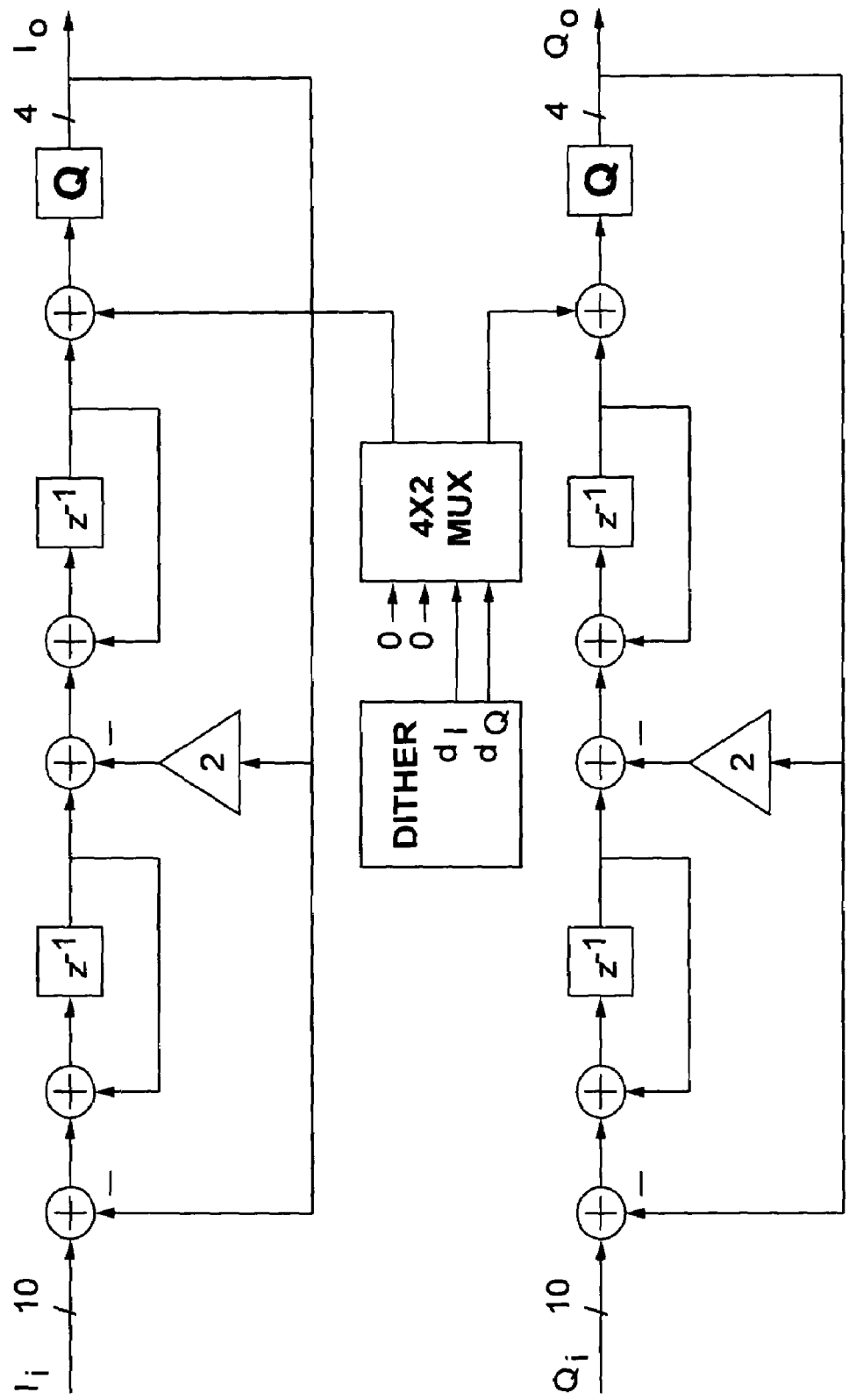
FIG. 18 shows a functional diagram of the Delta Sigma Requantizer block of FIG. 4.
Figure 19:
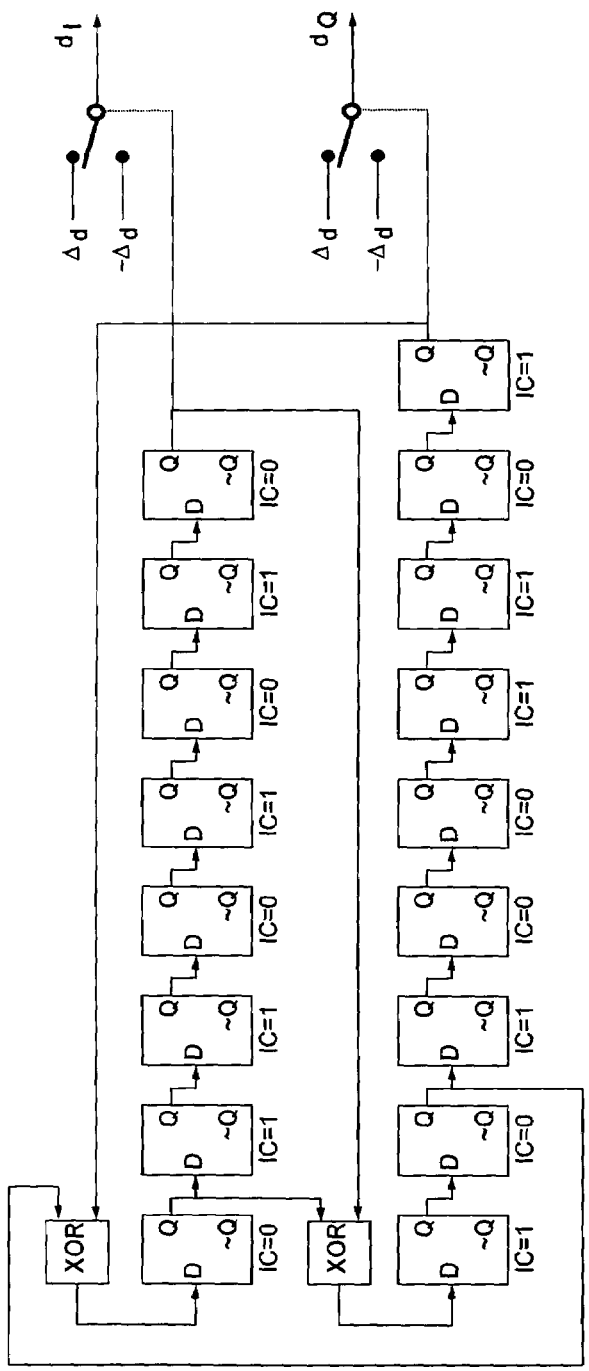
FIG. 19 shows details of the Dither Block of FIG. 18.
Figure 20:
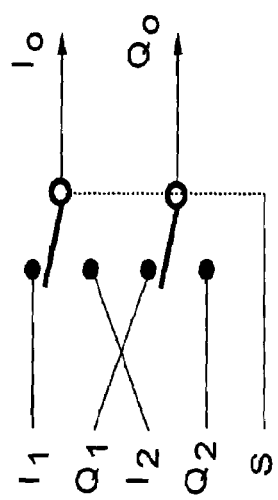
FIG. 20 shows a functional diagram of the 4×2 mux of FIG. 18.

FIG. 18 shows a functional diagram of the Delta Sigma Requantizer block of FIG. 4. It accepts 10-bit input data and re-quantizes to 4-bit output data in such a manner that most of the quantization noise can be filtered out by the following DAC and analog LPF. FIG. 19 shows details of the Dither Block of FIG. 18. FIG. 20 shows a functional diagram of the 4×2 mux of FIG. 18. One of average skill in the art can readily implement the DC offset compensation block, the interpolation filter block and the requantizer block in conjunction with a digital modulator.

FIGS. 21 through 29 demonstrate the effectiveness of the invention when the example transmitter goes through modulation switching from FSK to PSK and back to FSK. In order to show signal details of sufficient clarity, un-realistically small transmission sequences were chosen. Specifically, the transmitter operates in FSK mode for the first 20 us, then switches to PSK mode for 20 us, and then switches back to FSK mode for 20 us.

Immediately following the modulation switching times, "guard" times define the amount of time needed for the modulator output to be valid PSK or FSK modulation. The guard times largely depend upon the pulse shaping filters employed; for the case of the example Bluetooth Medium Rate transmitter, the minimum guard time needed for FSK-to-PSK switching is 4 us, the minimum guard time needed for PSK-to-FSK switching is 7 us.

Initially, the Modulation Switching Control sets the Pulse Shaping block to operate in FSK mode, and the 4×2 mux outputs (1,0) to the CORDIC inputs $I_i$ and $Q_i$. During this interval, the PSK Register & Mux Banks contain initialization data corresponding to the phasor $e^{j0}$.

After 20 us of FSK symbols, the Modulation Switching Control sets the Pulse Shaping block to operate in PSK mode, and PSK symbols start entering the Pulse Shaping block. At the same time, zeros start entering the FSK Register & Mux Bank causing a smooth down-ramp of the FSK signal. The 4×2 mux immediately switches to direct the PSK outputs of the Pulse Shaping block to the CORDIC. After 4 us, the output of the FSK Register & Mux Bank is zero, the guard time ends, and the modulation is valid PSK modulation.

After 20 us of PSK symbols, the Modulation Switching Control sets the Pulse Shaping block to operate in FSK mode, and FSK symbols start entering the Pulse Shaping block immediately following a forced PSK "switching symbol". This forced switching symbol corresponds to the phasor $e^{jF}$ that satisfies $$e^{j0}=e^{jF}\times\Pi_{n=0}^{k}e^{j\Theta_n}$$

which forces the Running Phasor Product output to the desired state $e^{j0}$. Subsequently, the Running Phasor Product block is "frozen" and symbols $e^{j0}$ enter the PSK section of the Pulse Shaping block. After 7 us (1 us due to the forced switching symbol plus 6 us for filter settling) the guard time ends, and the mux switches to direct (1,0) into the CORDIC. The modulation is now valid FSK modulation.

Figure 21:
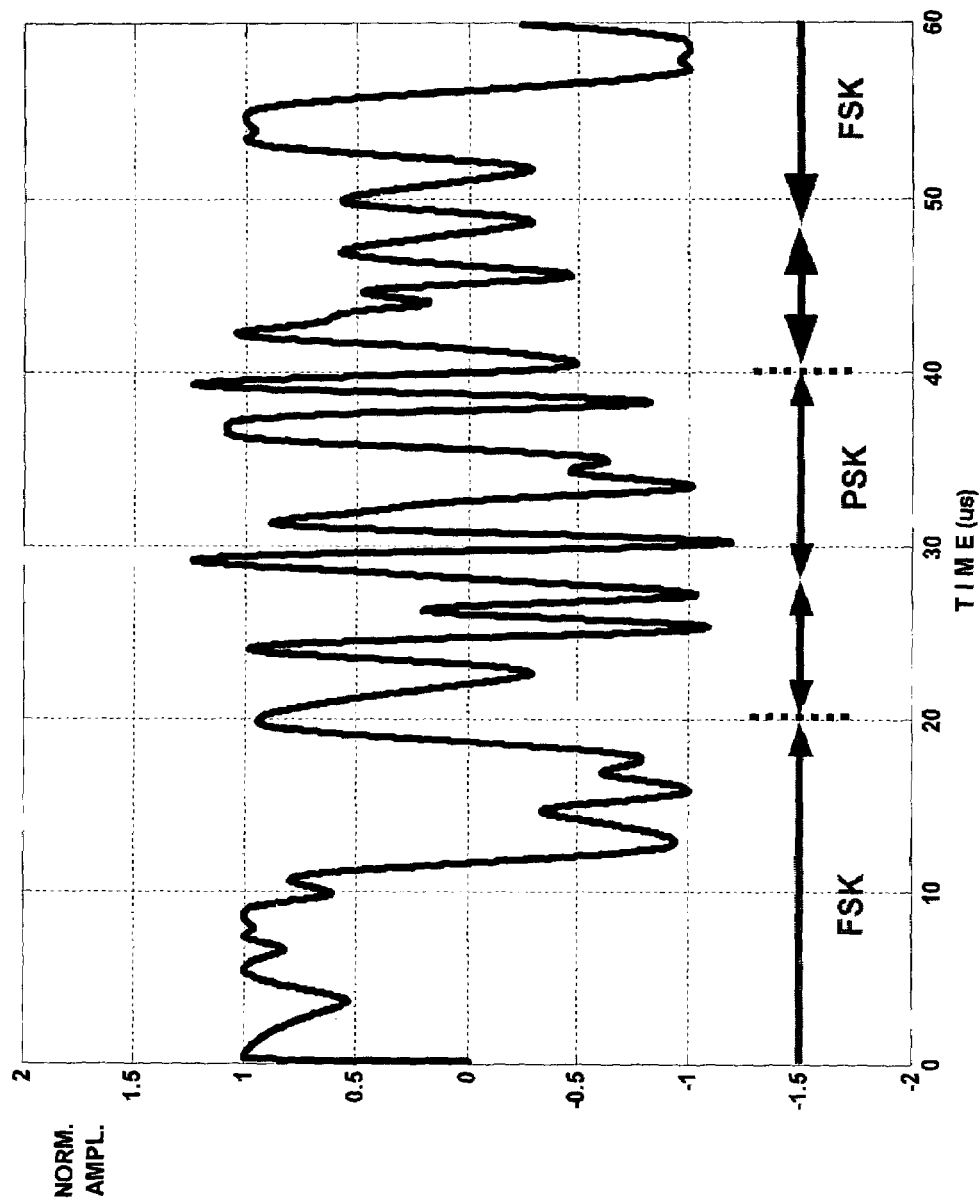

FIG. 21 shows typical behavior of the output of the Interpolation Filter block of FIG. 17 when the transmitter goes through modulation switching from FSK to PSK and back to FSK. The output amplitude is normalized to unity for FSK mode. The dotted vertical lines indicate switching times;

green arrows indicate the transmitter in FSK modulation mode; red indicates the transmitter in PSK modulation mode. Black arrows indicate guard times. Only the I-channel is shown; the Q-channel behaves similarly.

Figure 22:
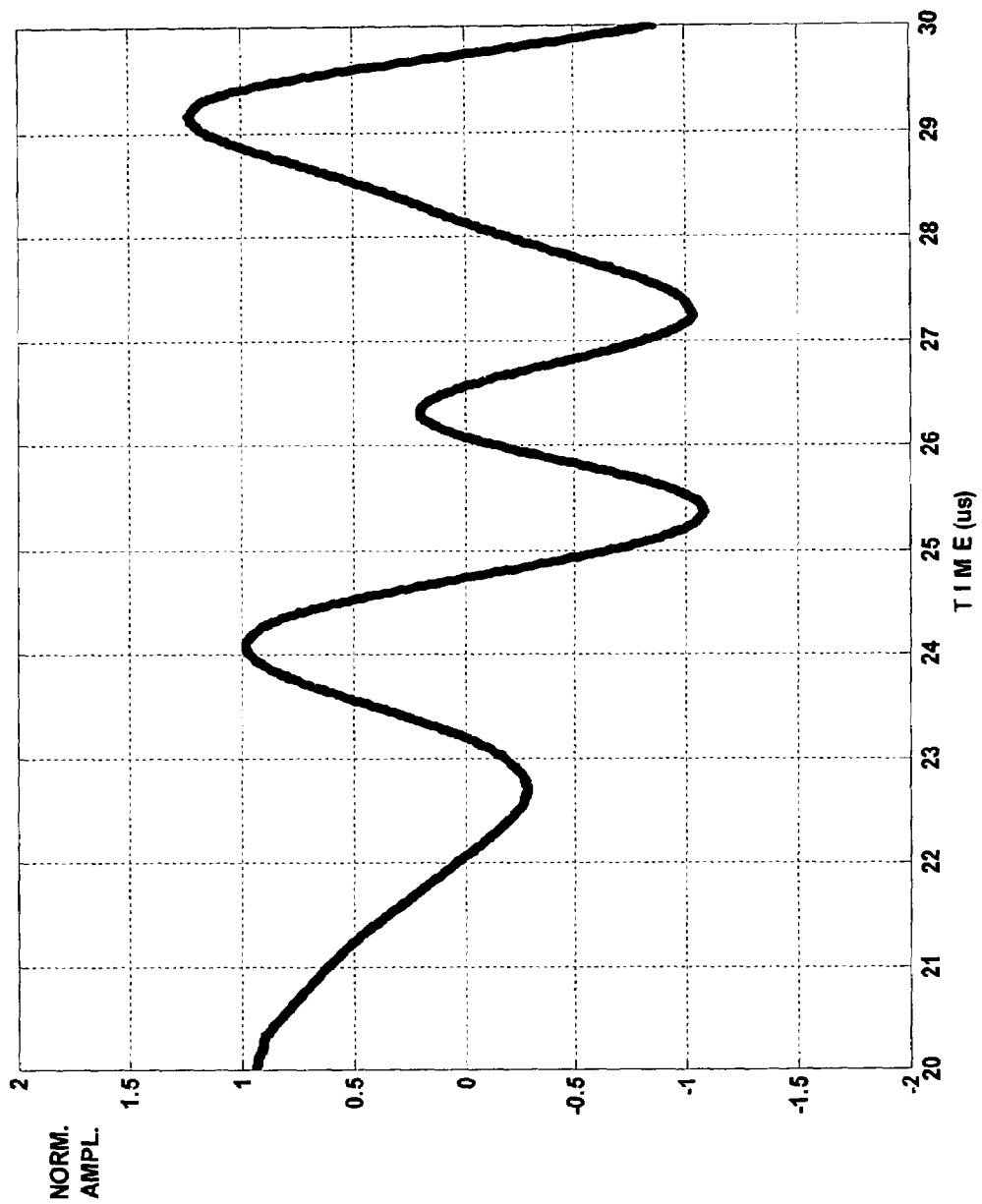

FIG. 22 is a close-up of the data in FIG. 21, demonstrating the smoothness of the FSK-to-PSK modulation switching.

Figure 23:
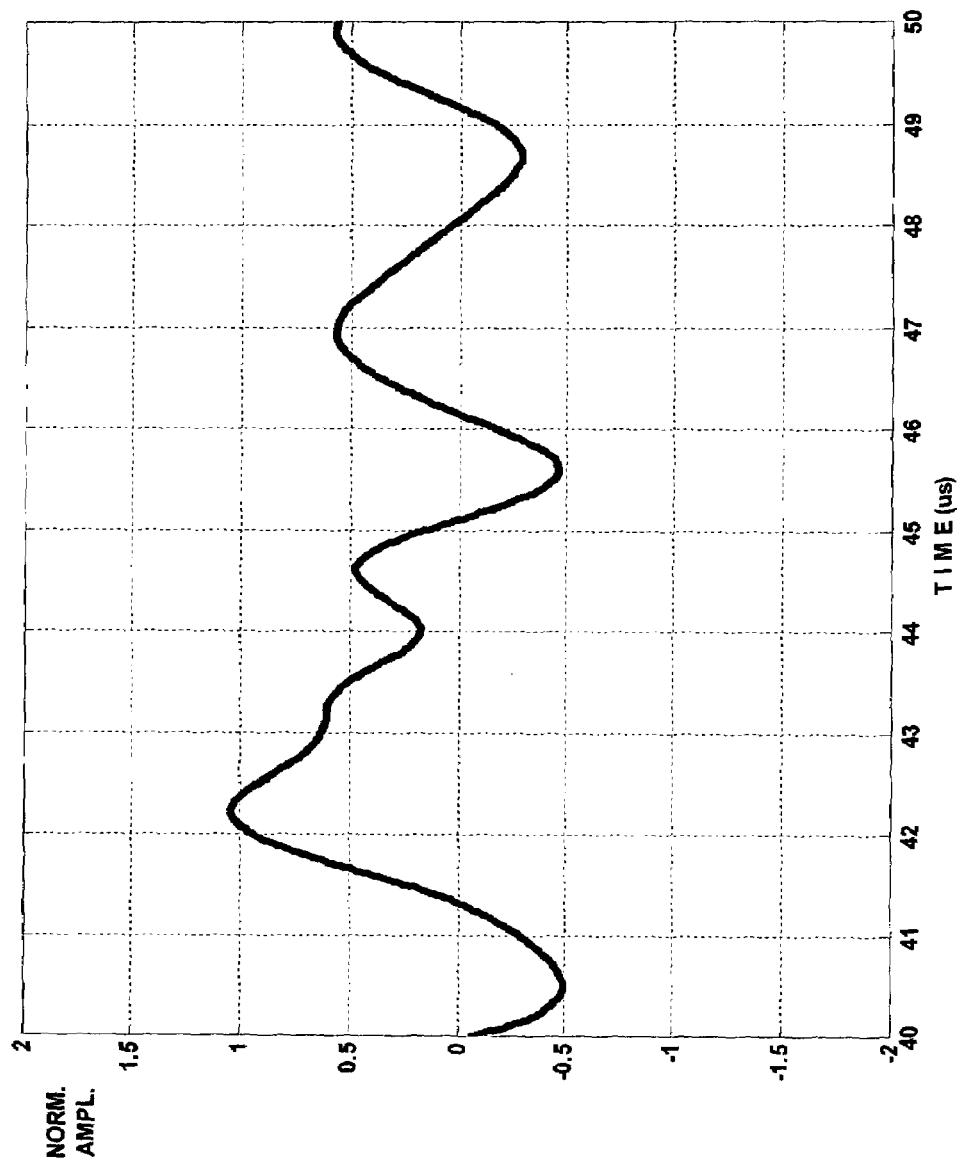

FIG. 23 is a close-up of the data in FIG. 21, demonstrating the smoothness of the PSK-to-FSK modulation switching.

Figure 24:
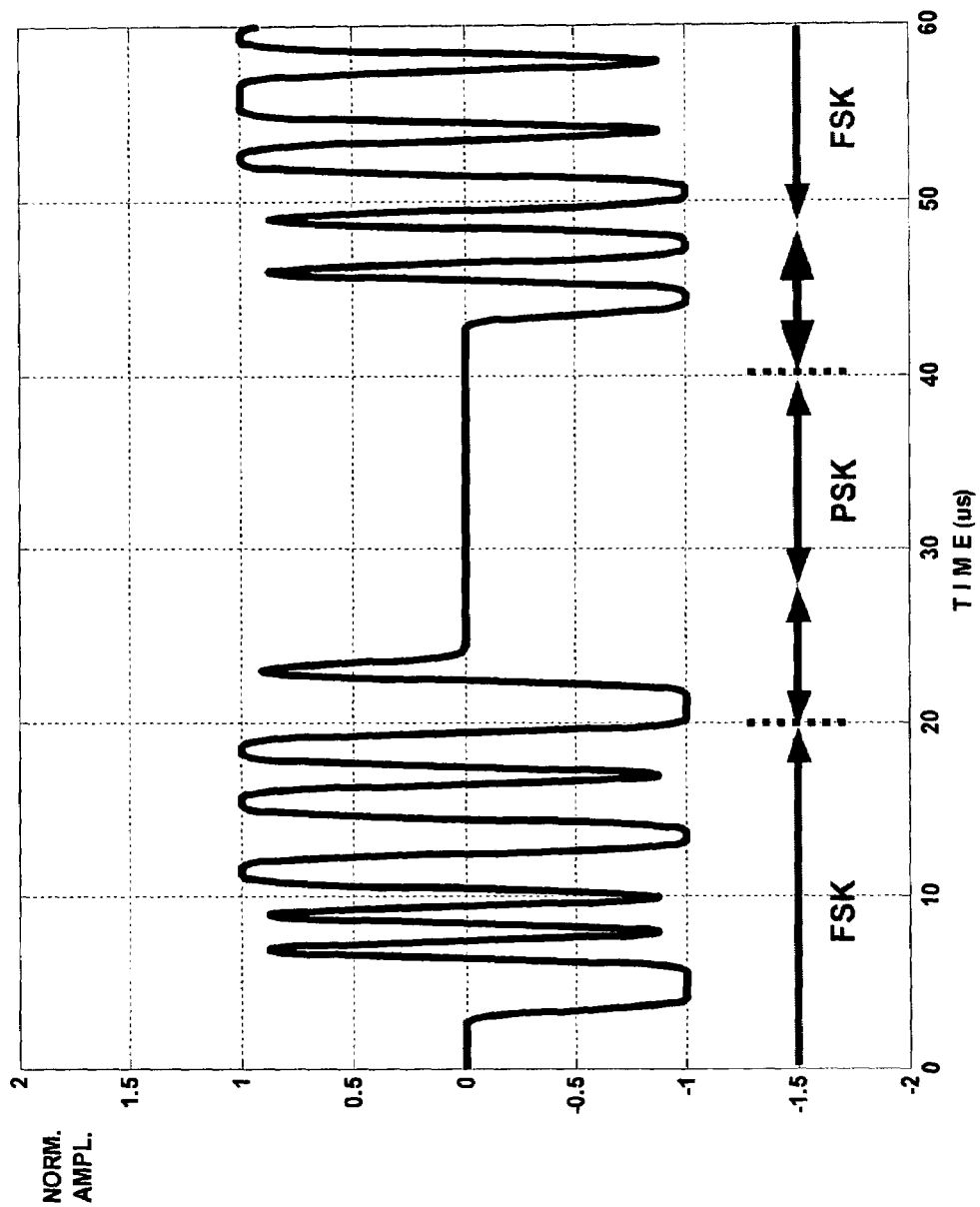

FIG. 24 shows typical behavior of the FSK output of the Pulse Shaping block of FIG. 4 when the transmitter goes through modulation switching from FSK to PSK and back to FSK. The output amplitude is normalized to unity. The dotted vertical lines indicate switching times; green arrows indicate the transmitter in FSK modulation mode; red indicates the transmitter in PSK modulation mode. Black arrows indicate guard times.

FIG. 25 shows typical behavior of the output of the Phase Accumulator block of FIG. 4 when the transmitter goes through modulation switching from FSK to PSK and back to FSK. The output phase is shown modulo $\pi$. Also, in this case, $IF_{VAL}>0$. The dotted vertical lines indicate switching times; green arrows indicate the transmitter in FSK modulation mode; red indicates the transmitter in PSK modulation mode. Black arrows indicate guard times.

FIG. 26 shows typical behavior of the I-channel output of the 4×2 mux block of FIG. 4 when the transmitter goes through modulation switching from FSK to PSK and back to FSK. The dotted vertical lines indicate switching times; green arrows indicate the transmitter in FSK modulation mode; red indicates the transmitter in PSK modulation mode. Black arrows indicate guard times.

FIG. 27 shows typical behavior of the Q-channel output of the 4×2 mux block of FIG. 4 when the transmitter goes through modulation switching from FSK to PSK and back to FSK. The dotted vertical lines indicate switching times; green arrows indicate the transmitter in FSK modulation mode; red indicates the transmitter in PSK modulation mode. Black arrows indicate guard times.

FIG. 28 shows typical behavior of the $PSK_I$ output of the Pulse Shaping block of FIG. 4 when the transmitter goes through modulation switching from FSK to PSK and back to FSK, as indicated in FIG. 21. The amplitude is normalized to unity steady state.

FIG. 29 shows typical behavior of the $PSK_Q$ output of the Pulse Shaping block of FIG. 4 when the transmitter goes through modulation switching from FSK to PSK and back to FSK, as indicated in FIG. 21.

The present embodiments of the invention provide a radio transmitter having a digital modulator that further includes logic for continuous amplitude and continuous phase modulation switching in an RF transmitter intended to support both frequency shift keying (FSK) and phase-shift keying (PSK) modulation techniques in a smooth and continuous manner that does not violate spectral mask requirements. Additionally, the symbol timing is preserved. The invention supports continuous modulation switching both ways, i.e., from FSK to PSK and from PSK to FSK.

A radio transmitter formed according to one embodiment of the present invention includes a Pulse Shaping block that is coupled to receive outgoing data (TX data) from a TX data source, such as a baseband processor. The Pulse Shaping block produces frequency shift keyed (FSK) modulated TX data and phase-shift keyed (PSK) I and Q channel modulated data concurrently. Multiplexer (mux) circuitry is coupled to receive the I and Q channel modulated data, as well as a logic 1 and a logic 0. In the described embodiment, the mux circuitry, which comprises a 4×2 mux, outputs one of the I and Q channel modulated data or the logic 1 and logic 0 according to a received control command. The Pulse Shaping block, in operation, modulates a stream of 0 bits and produces a stream of FSK modulated 0 values and PSK modulated I and Q data for a first logic state of a mode control signal, and further produces FSK modulated TX data for a second logic state of the mode control signal. Accordingly, the mux control circuitry, by sending control signals to the mux, couples either the PSK modulated I and Q data to downstream modulation circuitry for the first logic state of the mode control signal and couples the logic 1 and logic 0 to the downstream modulation circuitry for the second logic state of the mode control signal. The downstream modulation circuitry further includes a coordinate rotation digital computer (CORDIC) that receives the FSK modulated signals (either 0 values or phase information), as well as the I and Q channels (either the I and Q channel modulated data or the logic 1 and logic 0).

Coupled between the Pulse Shaping block and the CORDIC, is a phase accumulator that receives and accumulates phase information from the Pulse Shaping block. Accordingly, even when the Pulse Shaping block produces a stream of FSK modulated 0 values, the phase accumulator will produce a phase since its output is continuously fed into its input in a feedback loop. By adding a constant at the accumulator input, a phase ramp, or, equivalently, a non-zero IF frequency, can be imposed upon the transmitted signal. In operation, the radio transmitter initially operates in a first communication mode, transmitting communication signals to a remote agent according to a first protocol utilizing a first modulation technique at a first data rate. For example, the first protocol may comprise an FSK modulation for legacy Bluetooth protocol communications at a 1Mbps data rate. Upon determining that the remote agent is capable of communicating in a second protocol (e.g., medium rate Bluetooth) at a second data rate of 2 or 3Mbps utilizing a second modulation technique, the radio transmitter will operate in a transition mode for a short period transmitting communication signals with a remote agent according to the first and second modulation techniques. Finally, in a second communication mode, the transmitter transmits communication signals with a remote agent solely according to the second protocol utilizing the second modulation technique at the second data rate. Throughout the first and second communication modes, as well as the transition mode, the transmitter, according to the described embodiments of the invention, will transmit in accordance with spectral mask requirements.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

The invention claimed is:

1. A radio transmitter within a radio transceiver for producing phase-shift keyed (PSK) and frequency-shift keyed (FSK) modulated communication signals, comprising:
   a baseband processor for producing outgoing transmit (TX) data and a TX control signal;
   a digital modulator that receives TX data, that digitally modulates the outgoing TX data to produce one of a frequency shift keying (FSK) or phase-shift keying (PSK) modulated digital information signal based upon the TX control signal, wherein the digital modulator further includes:
a modulation switching control block that receives the TX control signal, producing a modulation control signal to select one of a plurality of types of modulation data, the modulation switching control block also producing a multiplexer (mux) control signal to couple one of the plurality of types of modulation data to a mux output;
a pulse shaping block for producing FSK phase information based upon a first value of the modulation control signal, which FSK phase information consists of one of a logic zero or a phase value for a FSK modulated signal based upon the TX data, the pulse shaping block further producing I and Q modulated data based upon the TX data for a second value of the pulse modulation control signal;
a multiplexer (mux) block coupled to receive the I and Q modulated data at a first input pair and further coupled to receive a logic one and a logic zero at a second input pair, the mux block producing the I and Q modulated data received at the first input pair based upon a first value of the mux control signal and for producing the logic one and logic zero received at the second input pair based a second value of the mux control signal;
a phase accumulator coupled to receive the FSK phase information, the phase accumulator producing an accumulated phase value;
a Coordinate Rotation Digital Computer (CORDIC) block coupled to receive the accumulated phase value and further coupled to receive the I and Q modulated data, the CORDIC block producing I and Q channel signals reflecting a phase and magnitude based upon the accumulated phase value and the I and Q modulated data wherein the CORDIC block produces outputs in one of three states based upon the FSK phase information and upon the I and Q modulated data and further wherein:
for a first state, the I and Q channel signals reflecting a rotated unit vector characterized by a phase reflecting the FSK phase information;
for a second state, I and Q channel signals reflecting a vector having a phase and a magnitude based upon the I and Q modulated data and further based upon the FSK phase information; and
for a third state, I and Q channel signals reflecting a vector having a phase and a magnitude based upon the I and Q modulated data;
a DC offset compensation block coupled to receive the I and Q channel signals, the DC offset compensation block for pre-compensating for expected downstream low frequency interference, the DC offset compensation block producing compensated I and Q channel signals; and
an interpolation filter producing up-sampled I and Q channel data characterized by an output sample rate based upon an input sample rate of the compensated I and Q channel signals;
digital to analog converter circuits for converting the up-sampled I and Q channel data to analog I and Q channel signals having a continuous waveform;
filtering circuits for filtering the analog I and Q channel signals; and
a loop circuitry for up-converting the analog I and Q channel signals from a baseband frequency to a specified RF channel.

2. The radio transmitter of claim 1 further including a requantizer within the digital modulator for reducing granularity of up-sampled I and Q channel data prior to the up-sampled I and Q channel data being converted to analog I and Q channel signals.

3. The radio transmitter of claim 1 wherein the TX data is produced by the baseband processor at one of a plurality of data rates and wherein the baseband processor produces the TX control signal to select one a plurality of corresponding modulation types.

4. The radio transmitter of claim 3 wherein the plurality of data rates comprise rates of 1 MHz and 2Mhz and corresponding modulation types of FSK and quadrature phase-shift keying (QPSK).

5. The radio transmitter of claim 4 further comprising a data rate of 3 MHz and a corresponding modulation technique of 8-PSK.

6. The radio transmitter of claim 3 wherein the baseband processor is operating according to a legacy Bluetooth protocol.

7. The radio transmitter of claim 1 wherein the TX data is produced by the baseband processor at a data rate of 1 Mbps which 1 Mbps TX data is FSK modulated and wherein the radio transmitter increases the data rate to at least a 2 Mbps data rate, which increased data rate is transitioned from the FSK modulation to a PSK modulation without spectral mask violation.

8. The radio transmitter of claim 1 wherein the pulse shaping block of the digital modulator further includes an FSK symbol mapper and a PSK symbol mapper, each of which is coupled to receive the TX data.

9. The radio transmitter of claim 8 wherein the FSK and PSK symbol mappers produce FSK phase data and constellation data, respectively, to a filter bank that, based upon the modulation control signal selects a corresponding filter of a plurality of filters.

10. The radio transmitter of claim 8 further comprising filtering means for filtering FSK and PSK symbols according to the modulation control signal.

11. A radio transmitter digital modulator, comprising:
a pulse shaping block coupled to receive transmit data (TX data) from a TX data source, the pulse shaping block producing frequency-shift keying (FSK) modulated TX data and phase-shift keying (PSK) I and Q channel modulated data concurrently;
a multiplexer (mux) circuitry coupled to receive the PSK I and Q channel modulated data and a logic 1 and a logic 0;
wherein the pulse shaping block FSK modulates a stream of 0 bits and produces a stream of FSK modulated 0 values and PSK modulated I and Q data based on a first logic state of a mode control signal and further produces FSK modulated TX data based on a second logic state of the mode control signal; and
wherein the mux circuitry couples the PSK I and Q channel modulated data to downstream modulation circuitry for the first logic state of the mode control signal and wherein the mux circuitry couples the logic 1 and logic 0 to the downstream modulation circuitry for the second logic state of the mode control signal.

12. The radio transmitter digital modulator of claim 11 wherein the downstream circuitry coupled to the mux circuitry comprises a coordinate rotation digital computer (CORDIC).

13. The radio transmitter digital modulator of claim 12 further comprising a phase accumulator coupled to receive the FSK modulated TX data and the modulated 0 values from the pulse shaping block, the phase accumulator producing an accumulated phase value.

14. The radio transmitter digital modulator of claim 13 wherein the CORDIC produces one of FSK or PSK modulated digital information signal further comprising I and Q channel modulated signals which are modulated based upon the accumulated phase value and the PSK I and Q modulated data.

15. The radio transmitter digital modulator of claim 11 wherein the radio transmitter initially transmits in an FSK modulation mode of operation and, while in the FSK modulation mode, transmits ID information in the FSK modulation mode.

16. The radio transmitter digital modulator of claim 15 wherein the radio transmitter determines that a remote communication device with which the radio transmitter is communicating is capable of higher data rate PSK modulation mode communications.

17. The radio transmitter digital modulator of claim 16 wherein the radio transmitter transitions to the higher data rate PSK modulation mode communications during a transition period and, after the transition period, communicates in the higher data rate PSK modulation mode communications.

18. The radio transmitter digital modulator of claim 17 wherein, while in the transition period, the radio transmitter does not violate spectral mask requirements.

19. A method in a radio transmitter, comprising:
producing, to a phase accumulator, frequency-shift keying (FSK) phase information based upon a first mode of operation and zero value phase information based upon a second mode of operation;
producing meaningful I and Q channel information to a multiplexer during the second mode of operation;
producing accumulated phase information from the phase accumulator to a coordinate rotation digital computer (CORDIC);
producing, from the multiplexer as inputs to the CORDIC, a logic one and a logic zero during the first mode of operation and producing the meaningful I channel and Q channel information during a second mode of operation; and
producing, from the CORDIC, one of an FSK or a phase-shift keying (PSK) modulated digital information signal, which, in the first mode of operation for FSK transmission, is based upon the logic one, the logic zero inputs and the accumulated phase information, and which, in the second mode of operation for PSK transmission, is based upon the accumulated phase information and upon the meaningful I and Q channel information.

20. A method in a radio transmitter, comprising:
in a first communication mode, transmitting communication signals to a remote agent utilizing a first modulation technique at a first data rate for frequency-shift keying (FSK) transmission using a logic 1 and logic 0 and an accumlated phase information;
determining that the remote agent is capable of communicating using a second modulation technique at a second data rate using meaningful I and Q channel information and zero phase information;
in a transition mode, transmitting communication signals to the remote agent according to the first and second modulation techniques at the second data rate during a transition period;
in a second communication mode, transmitting communication signals to the remote agent solely utilizing the second modulation technique at the second data rate; and
during the first and second communication modes and during the transition mode, substantillay transmitting within a spectral mask without spectral leakage.

* * * * *